United States Patent
Chung et al.

(10) Patent No.: US 10,853,809 B2
(45) Date of Patent: Dec. 1, 2020

(54) SYSTEM AND METHOD FOR CONDUCTING SECURE ELECTRONIC TRANSACTIONS

(71) Applicant: Avante International Technology, Inc., Princeton Junction, NJ (US)

(72) Inventors: Kevin Kwong-Tai Chung, Princeton, NJ (US); Albert Han-Ping Chung, Princeton, NJ (US); Yulin Huang, East Windsor, NJ (US)

(73) Assignee: Avante International Technology, Inc., Princeton Junction, NJ (US)

( * ) Notice: Subject to any disclaimer, the term of this patent is extended or adjusted under 35 U.S.C. 154(b) by 295 days.

(21) Appl. No.: 15/922,395

(22) Filed: Mar. 15, 2018

(65) Prior Publication Data

US 2018/0268414 A1  Sep. 20, 2018

Related U.S. Application Data

(60) Provisional application No. 62/601,363, filed on Mar. 20, 2017.

(51) Int. Cl.
*G06F 21/00* (2013.01)
*G06Q 20/40* (2012.01)
(Continued)

(52) U.S. Cl.
CPC ..... *G06Q 20/40145* (2013.01); *G06Q 20/206* (2013.01); *G06Q 20/409* (2013.01);
(Continued)

(58) Field of Classification Search
CPC .......... H04L 63/0861; H04L 2463/102; H04L 63/10; H04L 63/102; H04L 67/12
See application file for complete search history.

(56) References Cited

U.S. PATENT DOCUMENTS 5,715,314 A  2/1998 Payne et al.
5,774,870 A  6/1998 Storey
(Continued)

OTHER PUBLICATIONS

International Searching Authority/US, "International Search Report and Written Opinion" International Application No. PCT/US2018/022784, dated May 23, 2018, 13 pages.
(Continued)

*Primary Examiner* — Ghazal B Shehni
(74) *Attorney, Agent, or Firm* — Clemant A. Berard, Esq.; Dann, Dorfman, Herrell & Skillman, PC

(57) ABSTRACT

A system and method for conducting a tokenized electronic transaction may comprise: receiving identifying biometric data for the user, generating a biometric template representative thereof, and destroying the identifying biometric data. The identifying biometric data is not stored permanently, is not transmitted, cannot be derived from the biometric template, and is destroyed so that only the biometric template remains. The biometric template is attached to a transaction token for completing the transaction represented by the token including: comparing the token and attached biometric template with reference transaction data and with a reference biometric template. When the token matches the reference transaction data and the biometric template matches the reference biometric template, then the transaction is authorized and completed, and when the token and/or the biometric template does not match the reference therefor, then the transaction is rejected.

31 Claims, 8 Drawing Sheets

(51) Int. Cl.
*H04L 9/06* (2006.01)
*H04L 9/32* (2006.01)
*G06Q 20/20* (2012.01)

(52) U.S. Cl.
CPC .......... *H04L 9/0643* (2013.01); *H04L 9/3231* (2013.01); *H04L 9/3239* (2013.01); *H04L 2209/56* (2013.01)

(56) References Cited

U.S. PATENT DOCUMENTS

| | | | |
|---|---|---|---|
| 5,794,207 | A | 8/1998 | Walker et al. |
| 5,960,411 | A | 9/1999 | Hartman et al. |
| 6,973,581 | B2 | 12/2005 | Chung et al. |
| 7,197,167 | B2 | 3/2007 | Chung et al. |
| 7,894,634 | B2 | 2/2011 | Chung |
| 9,262,613 | B1 | 2/2016 | Harding |
| 9,286,511 | B2 | 3/2016 | Chung et al. |
| 9,384,518 | B2 | 7/2016 | Chung |
| 2005/0097037 | A1* | 5/2005 | Tibor ............ G06Q 20/206 705/39 |
| 2011/0000961 | A1* | 1/2011 | McNeal ............ G06Q 20/382 235/382 |
| 2012/0239924 | A1* | 9/2012 | Fedronic ............ G07C 9/37 713/153 |
| 2013/0117138 | A1* | 5/2013 | Hazel ............ G06Q 20/04 705/16 |
| 2013/0251214 | A1 | 9/2013 | Chung |
| 2014/0157384 | A1 | 6/2014 | Stern et al. |

OTHER PUBLICATIONS

Breebaart et al., "A Reference Architecture for Biometric Template Protection based on Pseudo Identities", Conference in BIOSIG, 2008, retrieved May 19, 2018 from http://citeseerx.ist.psu.edu/viewdoc/versions, 14 pages.

Avante International Technology, Inc., "Avante Payment Card and Biometric Point-Of-Sale (POS) tiered Payment System for Enabling Rapid Transition from Cash-Centric to Cashless economy from the 'First' to the 'Last' Miles of Nigeria", created Jun. 13, 2017, modified Jul. 6, 2017, 89 pages.

Crosman, "Sorting Out the Authentication Mess For Omnichannel Banking", American Banker, Jan. 12, 2017, 5 pages.

Wisniew Ski, "Fintechs Find Another Untapped Market: New Immigrants Needing Credit", American Banker, Feb. 9, 2018, 4 pages.

Yurcan, "When Fintech Lite is the Right Small-Business Lending Strategy", American Banker, Feb. 8, 2018, 3 pages.

Smart Card Alliance, "Smart Cards and Biometrics—A Smart Card Alliance Physical Access Council White Paper", Mar. 2011, 26 pages.

Wikipedia, "Tokenization (data security)", edited Jul. 27, 2018, 7 pages.

Visa, "All you need to know about Tokenization", undated—prior to Mar. 15, 2018, 1 page.

FSR Bits, "CTO Corner: Tokenization in Financial Services", Mar. 9, 2015, 10 pages.

* cited by examiner

| AUTHENTICATION | SECURITY LEVEL | ELEMENTS | APPLICATIONS |
|---|---|---|---|
| THREE FACTOR (TIER-3) | HIGH | SOMETHING YOU KNOW (PAN, USER ID) + SOMETHING YOU HAVE (PIN) + SOMETHING YOU ARE (BIOMETRIC IDENDIFICATION) | SECURE ELECTRONIC TRANSACTIONS <br> ONLINE BANKING <br> LARGE AMOUNT TRANSACTIONS |
| TWO FACTOR (TIER-2) | MEDIUM | SOMETHING YOU HAVE + SOMETHING YOU ARE -OR- SOMETHING YOU KNOW + SOMETHING YOU ARE -OR- SOMETHING YOU KNOW + SOMETHING YOU HAVE | MEDIUM AMOUNT TRANSACTIONS |
| ONE FACTOR (TIER-1) | LOW | SOMETHING YOU HAVE -OR- SOMETHING YOU KNOW | ROUTINE, DAILY, SMALL AMOUNT TRANSACTIONS |

FIG 5

SYSTEM AND METHOD FOR CONDUCTING SECURE ELECTRONIC TRANSACTIONS

This Application claims the benefit of U.S. Provisional Application No. 62/601,363 filed Mar. 20, 2017, and entitled "Biometric-centric Point-of-Sale and On-line Banking System for Secure Cashless Financial Transactions . . . ," which is hereby incorporated herein by reference in its entirety.

The present invention relates to a system and method for conducting electronic transactions and, in particular, to a system and method therefor employing tokens and biometric identifiers.

Modern electronic transaction systems employ tokens representing a transaction separately from sensitive financial information as a way of reducing the risk that data transmissions can be diverted or hacked in a way that exposes sensitive financial and other information to misuse or theft.

Modern systems also employ biometric identifiers as a way to authenticate and verify the identity of a person using the system thereby to increase security and reduce the likelihood that an unauthorized person can access and use the system. When the biometric identifier is obtained directly from a person physically present, imitation or counterfeiting of the identifier is extremely unlikely.

However, in conducting electronic transactions remotely where the user is not physically present in front of a person, e.g., a cashier or sales person, the user's biometric identifier is captured and transmitted to an authentication and/or verification server where it is compared to a reference specimen of the identifier. The biometric identifier is thus subject to being compromised in the equipment capturing the biometric identifier, e.g., a point-of-sale device or card scanner, and in transmission as well as through hacking of the authentication and/or verification server.

As the use of electronic transactions expands as it has been for the past decade, the cumulative risk of biometric identifiers being compromised has likewise increased and it is possible that if and when a significant number of biometric identifiers become compromised, i.e. come into the possession of malefactors, then biometric identifiers will no longer be suitable for reliable authentication and/or verification of a user's identity with a high degree of confidence.

Applicant believes there may be a need for a system and method for conducting electronic transactions that includes the security provided by tokens and biometric identifiers without exposing the biometric identifier to theft or misappropriation.

Accordingly, a method for conducting an electronic transaction may comprise:
 receiving a token representative of a transaction;
 receiving demographic data;
 receiving biometric data, wherein the biometric data is not stored permanently;
 generating a biometric template from the biometric data from which the received biometric data cannot be derived;
 destroying the biometric data, whereby only the biometric template remains;
 attaching the biometric template to the token;
 comparing the token and attached biometric template with reference data representative of the transaction and with a reference biometric template and then:
  when the communicated token matches the reference data and the attached biometric template matches the reference biometric template, then authorizing the transaction, and returning the token to communicate the completion of the transaction.

When the communicated token does not match the reference data and/or when the attached biometric template does not match the reference biometric template, then rejecting the transaction and communicating the rejection of the transaction.

Further, a method for conducting an electronic transaction may comprise:
 providing a token representative of a transaction;
 receiving demographic data;
 enabling the user device to receive biometric data, wherein the identifying biometric data is not stored permanently and is not transmitted by the user device;
 enabling the user device to generate a biometric template representative of the biometric data, wherein the biometric data cannot be derived from the biometric template;
 enabling the user device to destroy the biometric data, whereby the biometric data is destroyed and only the biometric template remains;
 enabling the user device to attach the biometric template to the token;
 receiving the token and biometric template for completing the transaction;
 comparing the token and biometric template with reference data representative of the transaction and with a reference biometric template, and then:
  when the token matches the reference data and the biometric template matches the reference biometric template, then authorizing the transaction, and returning the token to communicate the completion of the transaction.

When the token does not match the reference data and/or the attached biometric template does not match the reference biometric template, then rejecting the transaction and communicating the rejection of the transaction.

In addition, a computer-readable storage medium encoded with non-transitory computer instructions for conducting a transaction may comprise:
 means for causing a computer to provide a token representative of a transaction;
 means for causing the computer to receive demographic data;
 means for causing the computer to receive a biometric identifier;
 means for causing the computer to generate a biometric template representative of the biometric identifier, wherein the biometric identifier cannot be derived from the biometric template and the biometric identifier is then destroyed, whereby only the biometric template remains;
 means for causing the computer to attach the biometric template to the token; and
 means for causing the computer to receive the token and attached biometric template for completing the transaction represented by the token.

In summarizing the arrangements described and/or claimed herein, a selection of concepts and/or elements and/or steps that are described in the detailed description herein may be made or simplified. Any summary is not intended to identify key features, elements and/or steps, or essential features, elements and/or steps, relating to the claimed subject matter, and so are not intended to be limiting and should not be construed to be limiting of or defining of the scope and breadth of the claimed subject matter.

BRIEF DESCRIPTION OF THE DRAWING

The detailed description of the preferred embodiment(s) will be more easily and better understood when read in conjunction with the FIGURES of the Drawing which include:

FIG. 5 is a schematic diagram of a plural tiered layered security features usable with the system and method herein.

Figure 1:
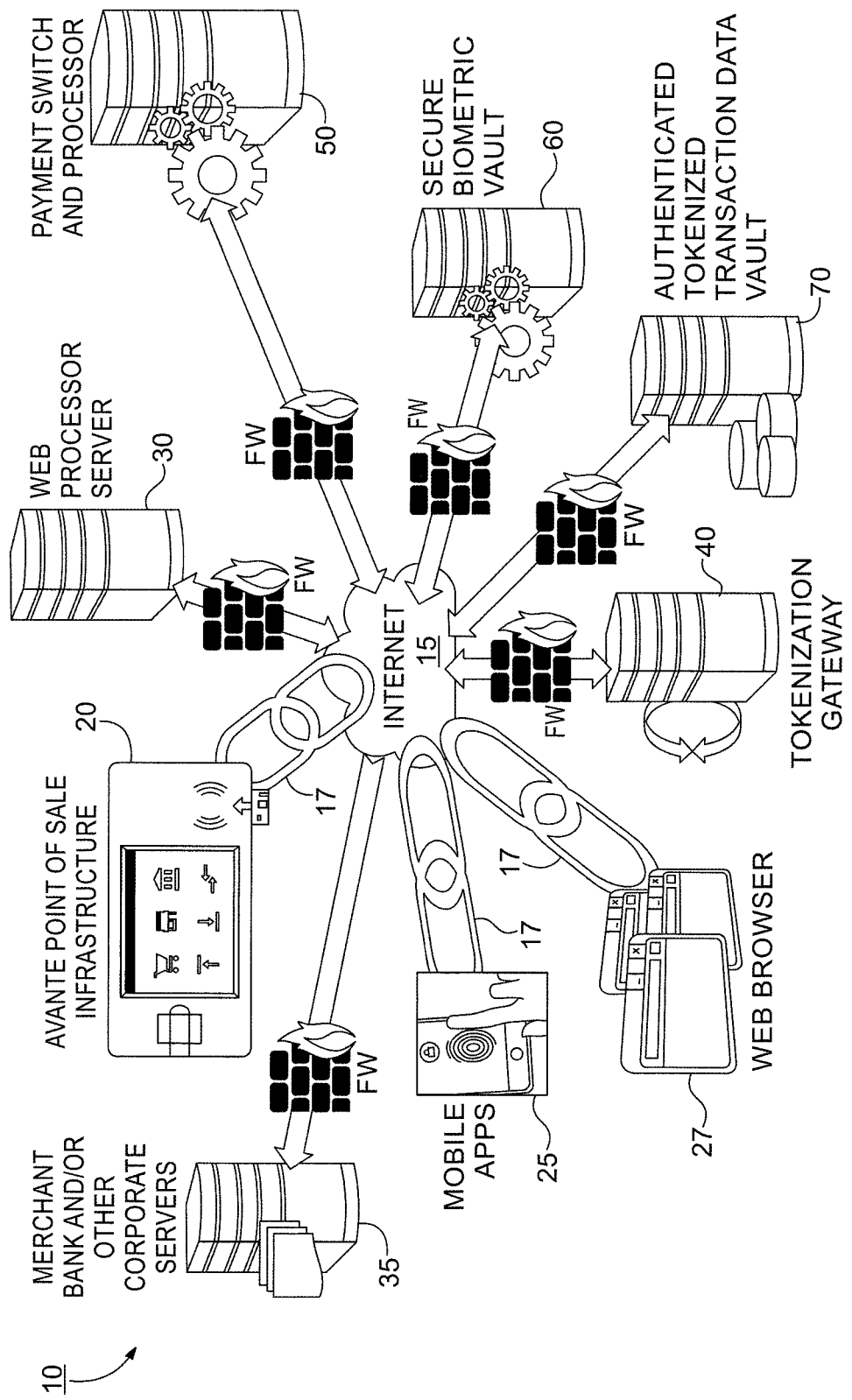
FIG. 1 is a schematic diagram of an example embodiment of a system for conducting a secure electronic transaction.

In the Drawing, where an element or feature is shown in more than one drawing figure, the same alphanumeric designation may be used to designate such element or feature in each figure, and where a closely related or modified element is shown in a figure, the same alphanumerical designation may be primed or designated "a" or "b" or the like to designate the modified element or feature. Similar elements or features may be designated by like alphanumeric designations in different figures of the Drawing and with similar nomenclature in the specification. As is common, the various features of the drawing are not to scale, the dimensions of the various features may be arbitrarily expanded or reduced for clarity, and any value stated in any Figure is by way of example only.

DESCRIPTION OF THE PREFERRED EMBODIMENT(S)

Figure 1A:
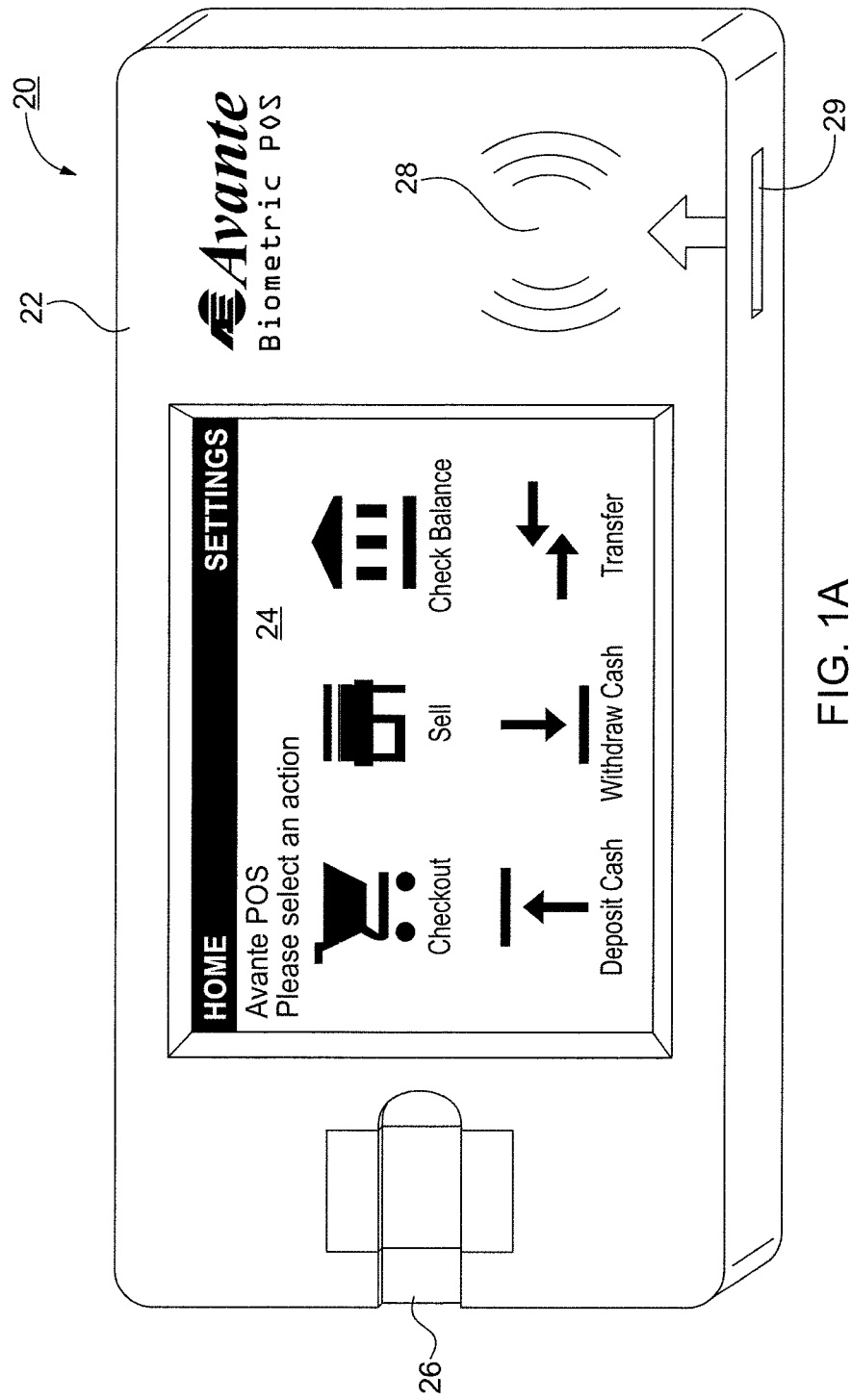
FIG. 1A is a schematic diagram of an example device usable with such example system.
Figure 1B:
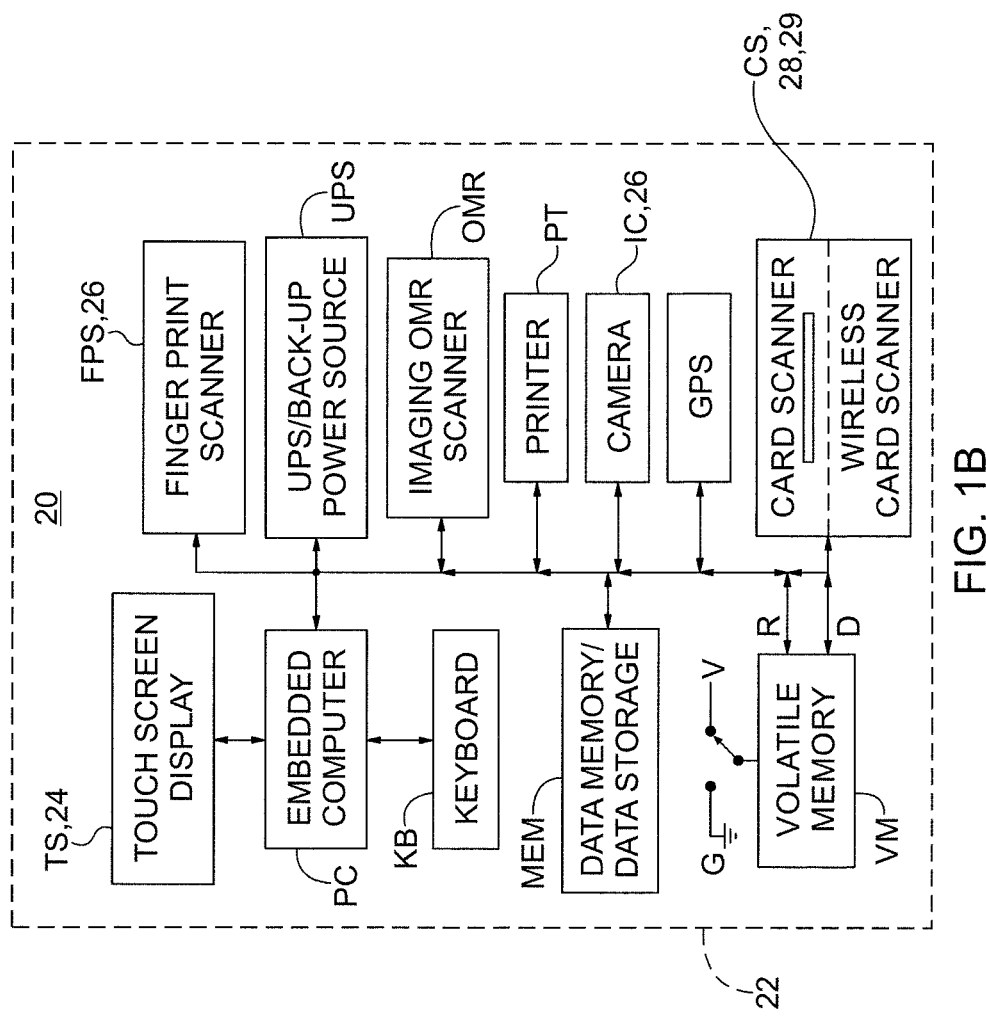
FIG. 1B is a schematic block diagram thereof.

FIG. 1 is a schematic diagram of an example embodiment of a system 10 for conducting a secure electronic transaction, and FIG. 1A is a schematic diagram of an example device 20 usable with such example system 10, and FIG. 1B is a schematic block diagram of the example device 20. System 10 includes various elements remote from each other that are connected to each other via various communication links and networks including the Internet 15. Transactions generally originate at a user terminal or user device 20, e.g., a point-of-sale (POS) terminal 20 or other POS infrastructure 20 providing similar functionality, providing appropriate security elements and biometric authentication elements as described herein.

Examples of suitable POS devices 20 include checkout stations, check-in stations, kiosks, vending machines, ATM machines, smart phones with a POS app, data terminals, tablet computers, portable computers, and the like. A POS device 20 may be provided by a user, by a business or other establishment, by a bank or other financial institution, by a seller or distributor, or by any other party desiring to engage in and/or conduct transactions with various users, and may be mobile or may be permanently or temporarily at a physical location, e.g., a location owned, rented or leased by a seller, buyer or by another party.

In the description below, a term such as "merchant" or the like may be used to refer to an entity and/or person having control of a POS device 20 or the like or who is otherwise responsible for one side of a transaction, and includes, e.g., a merchant, store keeper, seller, checkout person, cashier, monitor, teller, banker, financial advisor, and the like. Similarly, terms such as user, customer, client, account holder, buyer, seller and the like may be used to a refer to a party to a transaction, e.g., in different types of transactions. The use of any such term is not intended to exclude or preclude any other names for and/or positions and/or functions that may be held and/or performed by a party to a transaction.

While a specially configured POS device 20 may be preferable in certain situations, a POS device 20 may be provided by any electronic device 20 suitable for running a mobile app 25 and/or a web browser 27, and that is connectable to the Internet 15 via a WiFi, Bluetooth, or other wireless communication link 17. A suitable POS device 20 must be configured to include a secure element to receive and process user data and transaction data and a biometric authentication element to capture biometric data and generate a biometric template representative thereof without retaining the captured biometric data once the biometric template is generated.

An example POS device 20 includes a housing 22 which supports and contains the various elements of the device 20, such as a display 24, a biometric (e.g., fingerprint) scanner 26 or imager 26 other device or sensor 26 of one or more biometric identifiers of a user of the device 20, and an interface 28, 29 with a user card or identification device. Display 24 is preferably a touch screen display 24 through which data may be presented to a user in human perceivable form, e.g., as iconic elements, images, alphanumeric and/or symbolic text, and the like, and combinations thereof, and through which data may be provided and/or entered by a human user, e.g., by touching icons, parts of images and/or a display of a keyboard or other data entry of alphanumeric and/or symbolic text.

In the illustration of FIG. 1A a display screen 24 displays icons and/or images and/or text of a sort for enabling a user to select a type of transaction and/or action, e.g., a checkout for a purchase, a sale, checking of an account balance, depositing cash or cash equivalents, withdrawing of cash or cash equivalents and/or the transfer of funds between or among various accounts of the user and/or of third parties. Interface 28, 29 includes, e.g., a wireless or other contactless card reader 28 that preferably has a very short reading range (e.g., 1-5 cm) or a slot 29 for accessing a reader 29 for a contact-type card. The cards used therewith include, e.g., a credit card, a debit card, a driver's license, a government issued identity card, and/or any other suitable identification device or transactional device.

Preferably the biometric data (e.g., an image or other biometric data captured by sensor 26 that is usable as a biometric identifier) is positively and irretrievably deleted, e.g., erased and/or written over, all within the POS or other device 20 and is not merely flagged or otherwise indicated as deleted without the biometric data in fact being destroyed. The biometric template thereof must represent the biometric identifier, e.g., fingerprint, facial image, dynamic signature, eye scan, iris scan, and the like, with suitable resolution and specificity so as to be unique to the biometric identifier and must also not admit to the template being decoded, decrypted and or otherwise reversed so as to expose the biometric identifier itself.

Vendors, merchants, and other enterprises, for example, operate and enter into and complete electronic transactions of various types and kinds via a web processor server 30 on which reside web sites and other sales and transaction and information resources that are accessible via the Internet 15.

Banks, merchant banks, investment brokers, investment managers and other financial institutions, for example, operate and enter into and complete electronic transactions of various types and kinds via a merchant bank and/or other corporate server 35 on which reside web sites, account access, online banking, online investment, online management and other financial transaction and information resources that are accessible via the Internet 15.

The foregoing entity terminals and servers 20, 25, 27, 30, 35 interact with a tokenization gateway 40 that generates and verifies tokens representative of sensitive data such as transaction data and personal data and that is a substitute therefor that cannot be decrypted or otherwise decoded to reveal the sensitive data it represents and replaces. Examples of sensitive data include, e.g., credit and debit card numbers, account numbers, other sensitive numbers, holder's names and demographic data, security and verification codes, PIN numbers, other personal information, and the like. As a result the tokens are a substitute for and replace the sensitive data thereby relieving the merchants, banks, etc. from having to deal with, secure and protect the sensitive data while facilitating the processing, authentication and completion of various electronic transactions. Tokenization servers 40 may be provided and/or operated by a merchant, financial institution or other enterprise that is part of a transaction or by a trusted third party.

Payments and other transfers of money are processed and effected by a payment switch and processor 50 that receives the authenticated tokens representing various aspects of a transaction and if all are in order for the transaction to proceed, payment processor 50 performs the monetary aspect of the transaction, e.g., by transferring money or money equivalents from the account of a buyer or other payor to the account of the seller or other payee, e.g., by debiting the buyer/payor account and crediting the seller/payee account.

Biometric authentication is provided using a secure registration process and subsequently a secure authentication process. In the authentication process, for example, biometric image and related data is acquired temporarily while a template thereof is generated and then the biometric image and related data is destroyed so that it cannot be intercepted, retrieved or recovered. The actual biometric image and related data is never permanently stored in, or transmitted by or from the device, e.g., a device 20, that originally acquires the biometric image data, whereby the actual biometric image data is never at risk of interception, loss or theft, whether unintentional or intentional, whether benignly or by a bad actor or malefactor.

Similarly, the biometric image and related data acquired in the registration process is preferably acquired only temporarily until a biometric template thereof is generated and then the biometric image and related data is destroyed so that it cannot be recovered and compromised. Present day electronic transaction systems and processes are understood to typically retain and store the biometric image and related data, e.g., in a secure biometric data vault, however, such storage of the biometric image and related data is not necessary for the system 10 and process 100, 200 described herein, and is not preferred.

It is believed that greater security of the biometric image data is obtained when the biometric image data is destroyed once a biometric template thereof is generated so that the biometric image data is not thereafter retrievable, than typically results when that data is retained and stored irrespective of the level of physical, hardware and software security that may be employed. Simply put: if it's gone, it's gone.

Only the biometric template representing the biometric data is stored or transmitted, e.g., in a secure biometric vault 60, and the biometric template is formed such that the actual biometric data it represents cannot be derived, decoded or otherwise recovered from the biometric template. The biometric template representing the biometric data is stored e.g., in a secure biometric vault 60, where it is available to authenticate and verify requests for verification made by verified requesters for the biometric templates submitted thereby. The biometric templates stored in the secure biometric vault 60 are not accessible to any requester or other outside party and cannot be transmitted from the secure biometric vault 60.

A secure vault 70 is provided to receive and store authenticated tokens representing authenticated tokenized transaction data, e.g., the tokens representing various data and events relating to any given transaction. Preferably, token and transaction data stored in secure token vault 70 is both encrypted and hashed, but could be only encrypted or only hashed.

In addition to verification of identity being provided by the biometric template, an image, e.g., a photo or a cartoon, of an object, place, thing, or animal may be selected by or assigned to the user who will later be able to view such image when conducting a transaction to verify that the entity conducting the later transaction is in fact the entity with which the user initially enrolled or registered. Similarly, a word or phrase may also or alternatively be selected or assigned to further confirm the entity conducting the transaction, and the word or phrase may or may not be related to the image—it could be the name of what the image represents or it could be the user's answer to a security question during enrollment or registration, e.g., where were you born? or what was your first pet's name?

Communication between and among elements 20-70 of system 10 is conducted over various types and kinds of communication links and the Internet. Examples include WiFi, Bluetooth and the like relatively short range communication protocols 17, e.g., for communications between POS device 20, mobile devices 25, web browsers 27 and the Internet 15, and in addition various networks, shared links, common links and the like, e.g., intranet, ethernet, wired networks, optical networks, for communication between and among web server 30, tokenization gateway 40, payment switch 50, secure biometric vault 60 and secure tokenized transaction vault 70 including via the Internet 15. Redundant and/or plural communication links may also be provided to increase reliability and robustness.

Security is provided by firewalls FW in various ones of the communications links and/or servers/processors 30-70, as well as by encrypting and/or hashing the data that is transmitted over the various communication links. Further, each of the various servers and processors are preferably disposed within a facility that provides a level of physical security commensurate with the types and kinds of data processed and stored therein. Further security and robustness may be provided by running parallel and redundant servers and processors, e.g., one a primary server/processor and one or more servers/processors as back-ups, that are disposed in physically separate facilities that are remote from one another, in some cases in different geographical regions so that the data is retrievable even after a natural or manmade disaster that affects a widespread area.

The part 120 of the authentication process 100, 200, 250 that requires a user to confirm a displayed verification image and/or phrase that was previously specified and/or selected by the user, e.g., during the registration process, is designed to confirm and verify that the server that is serving as the token server 30, 35, 40 that is performing the authentication process is indeed legitimate. This authentication is in addition to the verification of the user who is requesting authentication for the transaction based on bank and/or verification data provided by the user ti initiate a transaction. When the server is deemed not legitimate, the user is instructed to abort the process of requesting authentication if he/she notices the same verification image and/or phrase being used in any subsequent transaction. The user is also requested, e.g., via notice in a pop-up box, to report the incident whenever possible so that the incident can be investigated for possible fraud and where appropriate, corrective action can be taken.

The tokenization server 30, 35, 40 will first verify that the POS device 20 or other user end device 20 is properly configured and has not been tampered with, e.g., either physically changing or replacing processing, memory and/or other specific components, and/or by any change having been made to the embedded software and/or firmware. Authentication devices, such as POS devices 20, are specifically constructed, configured, and programmed to prevent any possibility of interception during the short time in which the biometric image data is captured and is instantly and simultaneously being converted into a biometric template in the processor of the device 20. The biometric templates, e.g., to be used for authentication, are instantly hashed and encrypted with the token provided for the specific transaction in progress and optionally along with the unique identifier for the device 20, as well as the date and/or time and/or geo-location of the device 20. Hashing and encryption ensures the integrity of the transaction data as well as the prevention of any association of the biometric templates to the specific user even if the data were to be intercepted during transmission or otherwise compromised.

FIG. 1B is a schematic block diagram of example device 20 that preferably includes all of the apparatus necessary for it to serve as a registration device and as a POS transaction device 20 as described herein, as well as to serve as an identity verification device if called upon to do so. Device 20 includes a housing 22 or physical case 22 that contains all of the devices apparatus thereof, and housing 22 may have an optional cover that may be closed to protect touch screen TS, 24 and may be opened to expose touch screen TS. Typically a data entry device is provided by a virtual keyboard KB, typically a QWERTY keyboard, that is displayed on touch screen TS, 24. Optionally, a physical data entry device KB, e.g., a keyboard KB, also typically a QWERTY keyboard, may be provided as an attachable device connectable via a cable or wirelessly, or may be on housing 22, or may be on an optional cover such that keyboard KB is exposed when the cover is open. An optional cover may be hinged or otherwise pivotably attached to housing 22 so as to be movable between open and closed positions.

Typically a processor PC (which may be all or part of a personal computer PC) is included in device 20 to provide the embedded processor PC as well as touch screen TS, 24 and keyboard KB, 24. Typically, touch screen TS and keyboard KB may both be used in the entry of data, e.g., as in registration or for a high-volume POS device 20 where faster data entry is desirable, however, touch screen TS may be sufficient for conducting transactions. Computer or processor PC may be an actual personal computer, laptop computer, or tablet computer, or may be a PC motherboard, one or more microprocessors or other digital processors. Device 20 also includes one or more data storage devices and/or memories MEM for storing operating system and transaction software, certain transaction data, biometric template data, entered data, e.g., demographic, identifying and other data, and some or part of memory MEM may be provided and/or part of computer PC. Preferably data memory and storage MEM includes data storage devices of different types and kinds, e.g., a hard drive (magnetic), semiconductor memory (e.g., RAM, DRAM), an optical drive (e.g., for CD and/or DVD media).

A fingerprint scanner FPS, 26 and/or an imaging camera IC, 26 and/or another biometric image acquiring device 26, may be provided in housing 22 for capturing biometric data, e.g., fingerprint data and/or facial image data, and the like. Fingerprint scanner FPS has an exposed touch sensitive surface upon which fingers may be placed for capturing fingerprint data. Imaging camera IC, which may be optional, preferably has an exposed lens for capturing facial image data, and the lens may be in a fixed position or may be adjustable for capturing facial images for persons in different positions relative to device 20, e.g., a person entering data via keyboard KB or a person opposite a person entering data via keyboard KB. Fingerprint scanner FPS and/or imaging camera IC may be employed for capturing biometric data for registration and/or for verifying identity in conducting a transaction. Optionally, image camera IC may be provided as part of an accessory kit for a POS device 20 and may include a pan, tilt, zoom and/or focus unit whereby the camera direction may be controlled by a transaction operator, e.g., via the POS device 20 and/or an external control, and/or may be controlled automatically via the POS device 20 facial imaging software, e.g., to at least center and size a facial image, and optionally to focus the facial image, within predetermined image quality limits.

Volatile memory VM or similar provides a temporary storage location for biometric image data, e.g., acquired by fingerprint scanner FPS, 26 and/or imager IC, 26 and/or another biometric sensor, only during the short time that is required for generating a biometric template therefrom. Biometric image data is received, e.g., at a data port D thereof, for being temporarily retained. When the biometric template thereof has been generated, volatile memory VM is erased, thereby to destroy the biometric image data it once stored. Schematically this is illustrated, e.g., by a reset port R at which a reset signal is applied to positively erase memory VM and/or by a switch connecting an operating voltage V to memory VM wherein the switch is opened to remove the operating voltage V, whereby the data stored in memory VM is lost, and/or memory VM may be connected to ground G to speed up and make definite the removal of supply voltage V. Alternatively, volatile memory may be erased by storing different data therein via data port D, e.g., loading one or more pseudo-random numbers and/or one or more words of all 0s and/or all 1s, or any other data suitable for overwriting and destroying the biometric image data. In any event, the biometric data stored temporarily in volatile memory VM is destroyed and cannot thereafter be retrieved once the biometric template representative thereof has been generated.

Card scanner CS, 28, 29 captures data from, e.g., a user's payment card or other identification of payment instrument, and preferably is capable for scanning both contact type cards, e.g., those with an external pattern of electrical contacts, and wireless type cards, e.g., those with a radio frequency communication with card scanner CS, 28, 29, and may include capability for operating with automated payment instruments such as Android Pay, LG Pay, Samsung Pay, Walmart Pay, Google Wallet, Google Pay, Apple Pay, and the like.

An electrical interface may be provided on housing 22, e.g., on a rear or side surface thereof, for connecting POS device 20 to one or more external devices, and the interface may have an openable cover for protecting the interface and/or limiting access to the interface to persons authorized such access, e.g., persons authorized to conduct transactions with and/or for a user. The interface may include various data, signal and/or electrical power ports or connections, as described below.

Housing 22 also includes a source of electrical power for operating POS device 20. Typically the source of electrical power includes a power supply operable from available external electrical power, e.g., local 110 volt-220 volt AC power mains, and preferably a battery or other source of backup power in the event external electrical power is not available or is interrupted, thereby providing a so-called uninterruptible power source UPS. Optionally, an external charging device may also be provided, e.g., a solar power source.

A printer PT may be provided for printing documents produced at POS device 200, e.g., a registration receipt, a transaction receipt or record, and the like. Also, an imaging digital scanner OMR may be provided where POS device 20 is to be utilized for scanning user identification, payment cards, product labels, barcodes and the like.

Optionally, but preferably, a location determining device GPS, e.g., a Global Positioning System (GPS) device or other locating device, may be included in POS device 20 so that the location thereof may be correlated with specific operations and transactions performed thereby. Then the location of the POS device 20 at any given time may be, e.g., stored in the relevant database record and/or in the events log, and may be correlated with the specific operations and transactions performed, whereby the transactions and related events and operations may be geo-tagged. In addition, and optionally, the specific transactions, operations and/or data entered may be geographically overlaid onto a map, e.g., by a Geographic Information System (GIS) application or other software application, using GPS, geo-tagging and/or entered location data. The optional GIS software typically may be resident on a transaction or tokenization server 30, 35, 40 and/or another central server or other computer.

Figure 2:
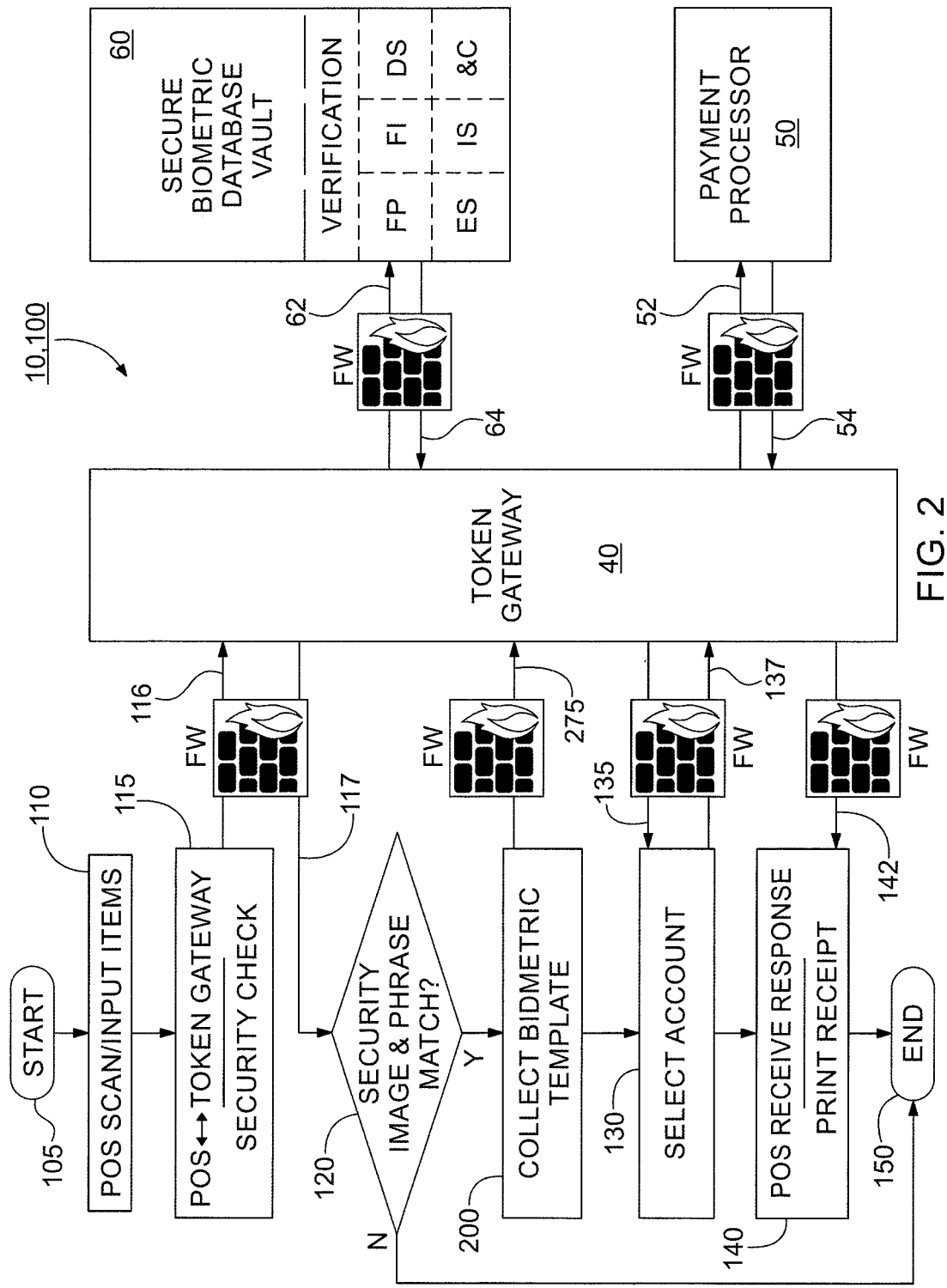
FIG. 2 is a schematic flow diagram of an example embodiment of a system and method for securely registering and authenticating a biometric identifier.
Figure 3:
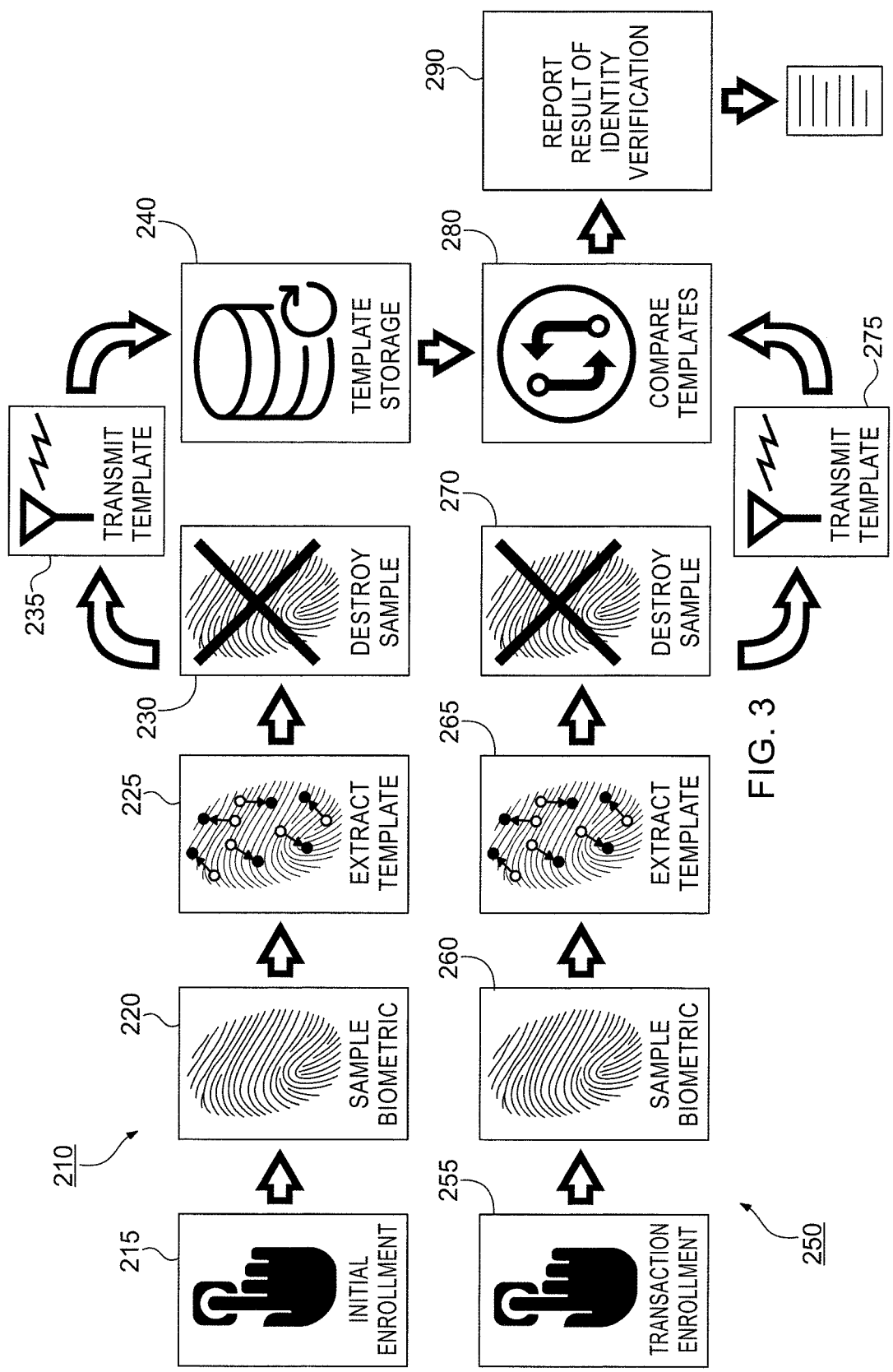
FIG. 3 is a schematic flow diagram of an example method for authenticating a biometric identifier in a tokenized transaction environment.

FIG. 2 is a schematic flow diagram of an example embodiment of a system 10 and method 100 for securely registering and authenticating a biometric identifier, and FIG. 3 is a schematic flow diagram of an example method 200 for authenticating a biometric identifier in a tokenized transaction environment 10, 100. Method/process 100 starts 105 and the point-of sale device is utilized to scan and/or input 110 various items of data including, but not limited to, the identity of the person seeking to conduct a transaction and of the transaction, e.g., a user and/or payor, the payor's primary number (PAN), personally identifiable information (PII), the nature of the transaction and of the items (e.g., goods and/or services involved), the time and date thereof, the identity and other data relating to the merchant, vendor and/or entity involved in the transaction sought to be conducted, and other data related thereto.

The primary account number (PAN) typically includes or is associated with a bank verification number (BVN) that uniquely links all accounts of a particular user/payor and a personal identification number (PIN) that the user/payor is issued and/or selects and that is not known to other persons unless disclosed by the user/payor. Typically, a BVN is established by a large bank, e.g., a national bank or a government central bank, whereas a PAN may be the account number of one of a user's several accounts maintained with a particular commercial or savings banking entity, private bank, state bank, credit union, and the like.

A security check 115 is initiated between the POS 20 and the token gateway 40 by communicating 116 one or more tokens representing the data input 110 data, e.g., the PAN, BVN and/or PIN, and the transaction data, to the token gateway 40 to verify the identity of the user and his account data, to check the integrity of the particular POS device 20 utilized and to verify its authenticity. The tokenization process will be aborted if the POS device 20 or any other remote transaction device 20 utilized is verified to have been or is suspected to have been tampered with.

If and when the user's identity, the user's account data and the integrity and authenticity of the POS device 20 are all verified, token server 40 communicates 117 security verification data, e.g., a security image and a security word or phrase that were assigned to and/or selected by the user as part of the user's enrollment or registration process, to POS device 20 where it is displayed to the user.

If the user determines that the security image and the security word or phrase do match 120 those assigned and/or selected as part of the user's enrollment or registration process, then the user indicates approval and process 100 can continue along path 120—Y to further security steps and to complete the transaction. If the user determines that the security image or the security word or phrase does not match 120 those assigned and/or selected as part of the user's enrollment or registration process, then the user indicates disapproval and process 100 is diverted along path 120—N to its end 150, and no transaction occurs.

When the security image and the security word or phrase do match 120 those assigned and/or selected as part of the user's enrollment or registration process, then POS device 20 is enabled to collect 200 a biometric identifier and generate 200 a biometric template thereof, and to communicate 275 only the biometric template to token gateway 40. The biometric template may represent various types and kinds of biometric identifiers including a fingerprint, facial image, a dynamic signature, an eye scan and iris scan, and the like (&C).

Process 200 includes in an initial operation an enrollment or registration process 210 for each user and thereafter performs a verification process 250 in relation to a transaction. Enrollment or registration process 210 and transaction process 250 while separate both commence with the same five initial steps 215-235 and 255-275, respectively. Steps 215, 255 commence enrollment and transaction enrollment, respectively, and each is followed by a collection or sampling 220, 260 of a biometric identifier represented by biometric image data of a user seeking to enroll (register) and conduct a transaction, respectively. In each process a biometric template is extracted 225, 265 from the collected biometric image data and the biometric image data sample is then hashed and encrypted before storage in a secure server system, e.g., secure biometric vault 60, or is destroyed 230, 270 so only the biometric template remains.

Extracting or generating 225, 265 the biometric template in each instance preferably includes first checking the quality and/or completeness of the biometric data sample and if the quality and/or completeness thereof does not exceed a predetermined standard, it is not processed further and another sample of the biometric identifier may be collected and checked for quality and/or completeness.

Quality standards that are tested or checked include, e.g., the sample of the biometric identifier having some or all of the following characteristics: completeness of the sample, physical size of the image of the sample, presence of certain predetermined features in the sample, presence of a predetermined number of features in the sample, presence of a minimum number of minutiae points in the sample, contrast of the image of the sample, or a combination thereof. In addition, plural samples may be taken, e.g., plural images within a short period of time, and each of the plural sample images may be tested against the predetermined quality standards for selecting the sample image of the highest completeness and/or quality, wherein the sample image may be, e.g., a fingerprint, facial image, eye scan, iris scan, and so forth.

Once a biometric identifier sample that meets or exceeds the predetermined quality and/or completeness standard is collected 220, 260, a template thereof is generated 225, 265 or extracted 225, 265. Examples of quality and/or completeness include, e.g., exceeding a minimum number of minutiae, exceeding a minimum area of the biometric identifier feature, having clear distinctions between closely adjacent features, and the like.

In addition, the enrollment or registration process 210 and/or transaction enrollment or registration process 250 preferably is terminated if a biometric identifier sample that satisfies the predetermined quality and/or completeness standard is not obtained after a predetermined number of unsuccessful attempts, e.g., three or four failed attempts. In one embodiment at least two quality factors for a biometric identifier sample must meet or exceed respective predetermined quality and/or completeness standards for that biometric identifier sample to be processed for generating (extracting) a biometric template thereof. In any event, all biometric identifier samples for authentication purposes are destroyed and are not retained or retrievable at the end of each of the processes 210 and 250, whether or not a satisfactory biometric sample is obtained or a biometric template thereof is made.

In addition, and optionally, generation 225, 265 or extraction 225, 265 of the biometric template may include generating a biometric template plural times from a set of distinct and different biometric sample images captured during processes 210, 250 and then testing the resulting biometric templates for consistency to verify that the collection 220, 260 and extraction 225, 265 of the biometric template was successful in producing a consistent result, and such plural processing may be preferred.

Following generation 225, 265 of the biometric template, the biometric identifier sample from which the biometric template is generated 225, 265 for authentication process 250 is destroyed 230, 270 permanently and completely and only the biometric template remains. Destroying 230, 270 the biometric identifier sample may be accomplished in several ways, all involving deleting the data that is the biometric identifier sample. In one arrangement, the biometric identifier sample data is stored temporarily only in a predetermined location in a memory and then that memory location is written over one or more times with different data, e.g., one or more random numbers, so that the biometric identifier sample data cannot be retrieved. Preferably the memory is a volatile memory so that data stored therein is lost when the memory is powered off, and in addition the memory may also be powered off at completion of generating 225, 265 the biometric template thereby to further render the data stored therein irretrievable 230, 270. During the authentication process 100, 200, 250, the personal data, e.g., identifying data, demographic data, biometric image data, and account data, is preferably hashed and encrypted immediately upon submission, e.g., into a POS device 20, to ensure that any attempt to associate the biometric data with the individual is made even more difficult, particularly for transactions relating to banking and other sensitive activities and data.

A secure biometric database stored in a secure biometric database vault 60 stores as records the biometric templates that represent the biometric identifier, e.g., fingerprint FP, facial image FI, dynamic signature DS, eye scan ES, iris scan IS, and the like, with suitable resolution and specificity so as to be unique to the original biometric identifier and must also not admit to the template being decoded, decrypted and or otherwise reversed so as to expose the original biometric identifier it represents. Biometric templates are communicated 62 from token gateway 40 to the biometric database of vault 60, e.g., for storage therein as part of an enrollment or registration process 210, and/or for comparison 280 as part of a verification process 250, also referred to as transaction enrollment or registration process 250. Confirmation of enrollment or registration of an enrollment biometric template, and/or authentication and/or verification of a transaction biometric template submitted for authentication and/or verification against an enrollment biometric template, are communicated 64 from biometric database vault 60 to token gateway 40 for further communication in relation to conducting a transaction.

Once generated or extracted 225, 265, the biometric template is communicated 235, 275 from the POS device 20 to be stored 240 in the secure biometric database vault 60, e.g., via token gateway 40 via communication paths 275, 62, in the case of enrollment or registration process 210. In the case of transaction enrollment process 250 the transaction biometric template is transmitted 275 e.g., via token gateway 40 via communication paths 275, 62, to the secure biometric database vault 60 whereat it is compared with the enrollment biometric template stored therein to determine whether or not the person seeking to conduct a transaction is in fact the person he purports to be. The result of that comparison 280 to verify identity and the transaction token for the transaction with which it is associated is reported 290, e.g., back to the POS device 20 from which the transaction is being sought to be conducted, e.g., via token gateway 40 via communication paths 135, 64, thereby to notify the user thereof via the display 24 of POS device 20 either that his identity has been verified and the transaction can proceed or that identity has not been verified and the transaction is terminated.

At this point the user's identity has been verified and the account to be used for the transaction is selected 130 and the tokenized account data and transaction detail data is communicated 137 to the token gateway 40 for conducting the transaction and the transaction is communicated 52 to the payment processor 50 which credits and debits the appropriate account or accounts involved in the transaction, e.g., the account of the user, the accounts of a buyer and seller or of a transferor and transferee. The transaction result, e.g., including identifications of the parties, of goods and/or services, of accounts and/or amounts credited and debited, of an account balance, and the like, is communicated, e.g., via token gateway 40 via communication paths 54, 142, to POS device 20 which receives 140 the response and displays same to the user and/or provides 140 a receipt, e.g., via text message, e-mail and/or a printed receipt.

The transaction having been denied or completed, process 100 then ends 150.

As previously described and as preferred, servers/processors 30-70 and communication links 116, 117, 275, 62, 64, 135, 137, 52, 54 and 142 are secured by firewalls FW and by encrypting and/or hashing of data. Also as previously described and as preferred, a security image and/or security word or phrase is selected or assigned as part of the enrollment or registration process 210 and that security image and/or word or phrase is included in the reporting 290 of a successful identity verification so that the user can verify therefrom that the entity conducting the transaction is the entity that the user intends to transact through.

Among the features of system 10, method 100 and POS device 20 that provide advantage over other systems and methods are: that a user's unique biometric identifying features (data) are captured using a specialized POS device, whether by configuring a device such as a smart phone or tablet computer, e.g., by application software, or by providing a specially configured POS device 20, whereby, the biometric image(s) are sampled and then are immediately processed to be checked for satisfactory "quality of image" before generating a biometric template therefrom that is thereafter used for verification of identity in conducting a transaction.

Biometric sampling POS device 20 is programmed to not store the biometric identifying data, but to generate the biometric template representative of the biometric identifying data and then destroy the biometric identifying data, thereby to prevent retrieval of the biometric identifying data, whether from tampering with the POS device 20 or by reading data from its memory or storage elements, and so the image of the biometric data originally captured for security protection cannot be retrieved or compromised.

The biometric template is immediately hashed and encrypted, preferably with the token of the transaction received over the Internet. The biometric template is decrypted and used for verification of the user with their requested transaction in a protected biometric template database that is stored in a secure biometric vault 60, wherein the biometric template will be stripped from the transaction verification token after successful verification of the biometric template.

To balance the ease of use of the POS device 20 and transaction system 10 and the security of financial transactions, tiered levels of requirements for authentication of the POS device 20 and a user thereof may be incorporated. For low level transactions, provision of a secured stored value in the smart card may be sufficient to provide adequate security. For high value transactions, more than one biometric identifier may be required to be used for providing a more secure transaction. Additionally, the quality of the biometric image data and of the converted biometric templates thereof may be required to be higher, e.g., to have a greater number of minutiae, and/or the matching of a higher number of minutiae in the biometric template may also be required for approval of a transaction, e.g., for higher value transactions.

Figure 4A:
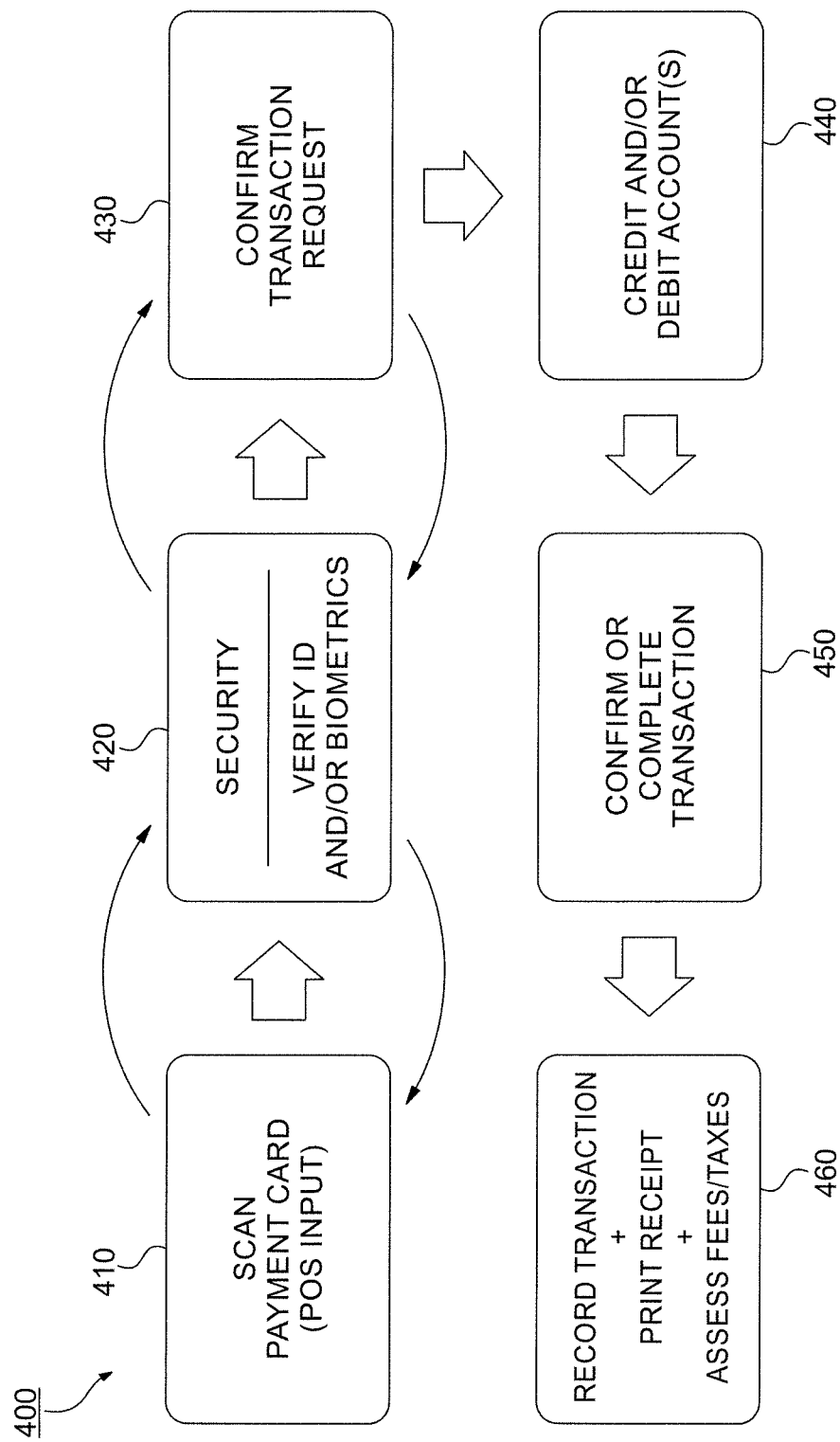
FIGS. 4A and 4B are generalized schematic flow diagrams representative of examples of various different types and kinds of transactions that can be conducted by the example system and method herein.
Figure 4B:
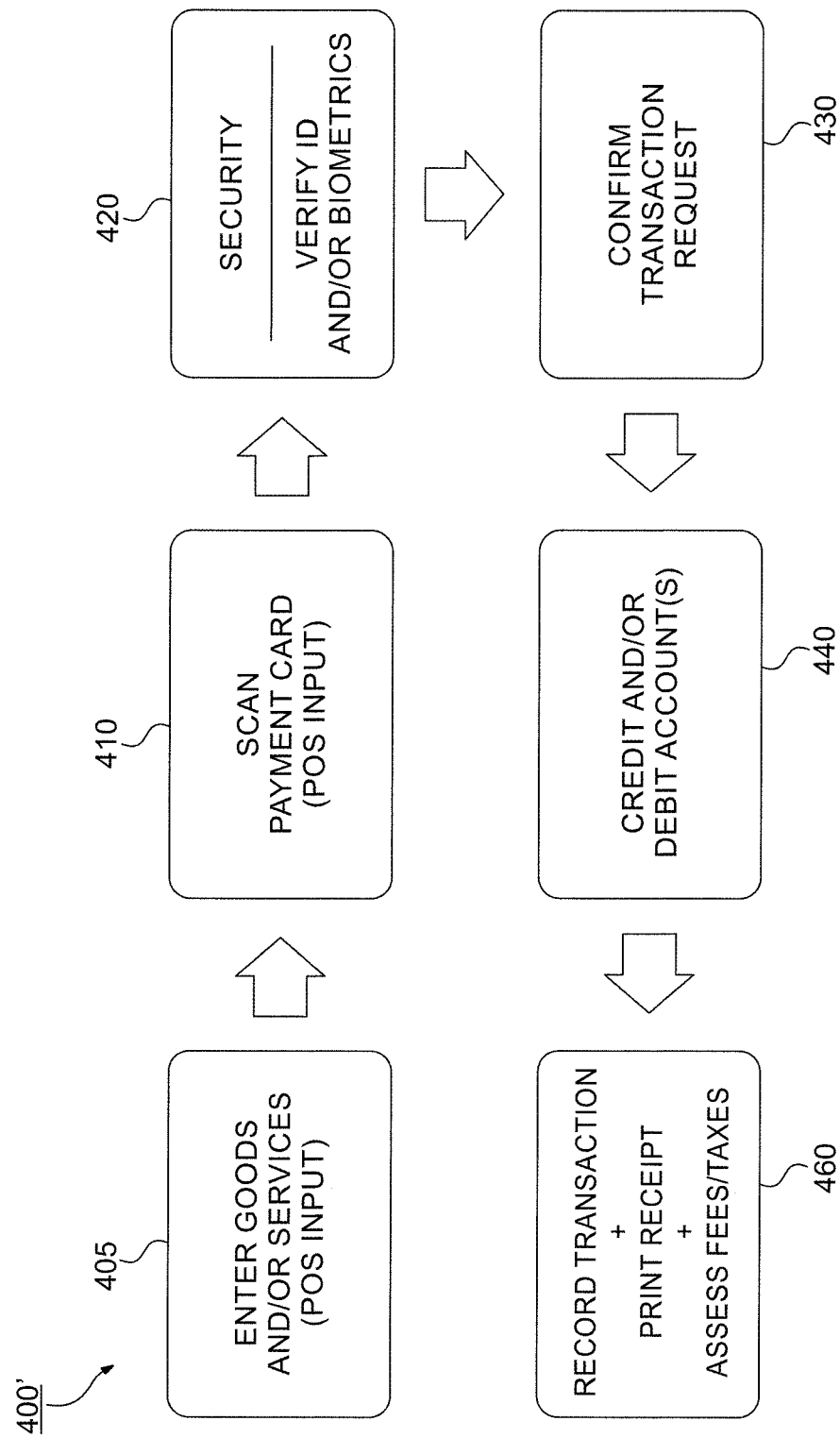

FIGS. 4A and 4B are generalized schematic flow diagrams 400, 400' representative of examples of various different types and kinds of transactions 400, 400' that can be conducted by the example system 10 and method 100 herein. Among the transactions 400, 400' that can be conducted under this generalized method or process 400, 400' are: a checkout for purchases of goods and/or services, a sale of goods and/or services, a checking or verifying of account status and/or balance and/or other condition, a deposit of cash and/or a check to an account or accounts, a withdrawal of cash and/or a check from an account or accounts, and/or a transfer of funds from one account to another whether of the user/payor and/or of a third party, e.g., as in electronic wires of funds, paying and/or collecting on a bill, and/or managing one's finances and/or investments. It is noted that while the system 10 and method 100, 200 are particularly well suited for conducting cash-less electronic transactions, system 10 and method 100, 200 are also suitable for conducting transactions involving cash, as described.

In each of the foregoing examples, the electronic transaction is processed in similar manner whether conducted from a physical location, e.g., a store or kiosk or other "brick-and-mortar" facility, or via the Internet or other network or website, or by and/or from any other suitable facility and/or device.

Certain types of transactions may utilize certain ones of the steps in a different order than illustrated, and examples thereof are indicated by pairs of thin line arrows pointing in opposite directions between boxes for interchangeable ones of the steps that they point to. Further, certain types of transactions may not utilize all of the steps 410-460 represented in the process 400 as illustrated.

Parties to a transaction may be known by different terms in relation to different types and kinds of transactions, and the use of any such term should not be interpreted as limiting the scope of transactions herein. Examples of such term include, e.g., a merchant, store keeper, seller, checkout person, cashier, monitor, teller, banker, financial advisor, agent, representative, service provider, user, customer, client, account holder, buyer, seller, payor, payee, and the like. Further, the use of any such term is not intended to exclude or preclude any other names for and/or positions and/or functions that may be held and/or performed by a party to a transaction.

Step 410 is the initial step in conducting many a transaction and may vary in its details in conformity with the requirements of a particular type and kind of transaction, as well as with various formal and informal conventions and traditions regarding certain types of transactions, as may any of the steps 410-460. For example, it is conventional in sales transactions in many cultures that a buyer positively order and/or actually possess the items to be purchased before the seller is paid therefor, although there are exceptions. Typically, the same convention is typically followed in a cashless and cash based electronic transaction in those cultures.

In relation to FIG. 4A for a transaction comprising making a deposit of funds or making a withdrawal of funds or making a transfer of funds, step 410 comprises scanning a payment or POS card using a POS device 20, whether that be by wireless communication with a wireless card, contacting a chip card or reading a magnetic stripe card, to obtain the data stored therein, e.g., data relating to the card holder, his account or accounts, and other demographic and/or identity data. Step 410 also comprises inputting value data, e.g., data specifying the amount of the funds to be deposited, withdrawn and/or transferred, and may be considered as part of step 410 or may be considered as a separate step which if so considered would typically precede the scanning of the POS payment card. A token representing the transaction is generated and communicated to the token gateway and so forth as described above as part of this step once the transaction is defined.

For the transaction comprising making a deposit of funds or making a withdrawal of funds, step 420 typically follows step 410 and comprises the user submitting security data including a PAN, a PIN and biometric identifying data, such as a fingerprint, facial or eye scan, and the like, whereby the authenticity and identity of the user and the payment card may be verified before the transaction proceeds further. The biometric template is attached to the transaction token. Next, under step 430, the merchant confirms the transaction by entering the merchant's PIN which in the case of a deposit of funds, the merchant will have received the funds as part of either step 420 or step 430, i.e. before confirming the transaction and having received the funds.

For a transaction comprising the making a transfer of funds, step 430 typically follows step 410 and comprises the user inputting transaction data such as identifying the recipient account to which the funds are to be transferred, e.g., an account number, user name or other specification of the recipient of the funds to be transferred. Thus having defined the funds transfer transaction, whereby a transaction token is generated, the user in step 420 provides his identifying security data, such as his PIN and his biometric identifier (which is destroyed once a template thereof is generated), and the security data is attached to the transaction token.

Then in step 440, in a deposit funds transaction the user's account is credited in the amount of the funds deposited and in a withdraw funds transaction it is debited in the amount of the funds withdrawn. Also in step 440, in a transfer of funds transaction the transferor (user's) account is debited and the transferee (recipient's) account is credited in the amount of the funds being transferred.

In step 450 the transaction is confirmed, e.g., by its particulars being displayed on the POS device 20 for inspection by the party conducting the transaction. In the case of a deposit of funds the amount credited to the user's account and the identity of the account is displayed and the user can confirm that by again entering his security data including his biometric identifier (as above). In the case of a withdrawal of funds the amount debited from the user's account and the identity of the account is displayed and the merchant can dispense the funds in cash to the user who then confirms the receipt of the funds by again entering his security data including his biometric identifier (as above). In the case of a transfer of funds the amount debited from the user's account and the identity of the user's account is displayed as is the identity of the recipient's account and the amount credited to the recipients account are displayed and the user can confirm the correctness thereof by again entering his security data including his biometric identifier (as above); separately, the recipient can verify receipt of the transfer by accessing his account and viewing the amount credited thereto.

The transaction having been completed 410-450, the transaction is in step 460 recorded as being completed in the official records of the entity conducting the transaction and a receipt thereof is provided to the user (the party initiating the transaction), e.g., by printing a receipt at POS device 20 or alternatively or additionally at the user's instruction, by printing a receipt at another designated device and/or by e-mail or text message. In addition, step 460 also includes the assessing of fees and/or taxes, if any, that may be incurred by or in conducting the transaction, e.g., processing fees, sales taxes and/or transfer taxes, and including those in the transaction records and provided receipts, and in paying such fees and/or taxes contemporaneously with completing the transaction, e.g., in "real time."

In relation to FIG. 4B for a transaction 400' comprising, e.g., the purchase or sale of goods and/or services, the steps of both of the transactions are essentially parallel in substance, although various different terms may be used to refer to the selling party and the buying party in different environments. It is noted that the two transactions are essentially the same in that in both there are a both a buyer and a seller seeking an exchange of goods and/or services for something of value, e.g., money or its equivalent.

Method or process 400' begins with the entering or inputting 405 of the goods and/or services sought to be bought, e.g., in a store or online merchant establishment, or sought to be sold, e.g., as a farmer or craftsman bringing his products to a wholesaler or distributor. The inputting step 405 is typically done using the POS device 20 to create an electronic list of the goods and/or services, e.g., by the scanning of barcodes, electronic tags or another identifier of the goods and/or services, e.g., by an imager or other sensor thereof, or by manually inputting the descriptions and/or identifiers of the goods and/or services, e.g., using a physical or actual keyboard of POS device 20, which data is converted into a token as described.

The payment card is scanned 410 in like manner to that described above, e.g., by one of the scanners and/or readers of the POS device 20, for entering the party's identity and account data, which is part of defining the transaction that becomes the transaction token. The security step 420 follows in which security data is obtained including, e.g., account data, PIN or other security data, and biometric data as described for verifying the identity of the POS payment card user. As described, a biometric template is generated representing the biometric data which is then destroyed so that it cannot be compromised while the biometric template is attached to the transaction token and utilized thereafter for conducting the transaction 400'.

Thereafter the transaction is confirmed 430 as above, e.g., by the merchant or seller submitting 430 his PIN or other confirming data so that the appropriate accounts can be credited and debited 440, e.g., in the case of a sale of goods the merchant's account is credited 440 by the value of the sale and the buyer's account is similarly debited 440, and in a sale of product by a producer the producer's account is credited 440 by the value of the sale and the buyer's account is similarly debited 440.

Finally the transaction is recorded 460 and a receipt provided 460 as above. In addition should any fees and/or taxes be due, those fees and/or taxes are assessed 460 and the account of the appropriate party, e.g., the account of the buyer and/or seller depending upon who the fee and/or tax is to be paid by, is debited by the amount thereof.

In addition, the method 400, 400' is applicable to other types and kinds of transactions. For example, a person desiring to check the balance of his account can do so be scanning 410 his payment card using a POS device 20 to establish his identity and input 420 his security data including having his biometric identifier sensed 420. The foregoing results in the generation of a token and a biometric template (the sample of the biometric identifier having been destroyed in the process) to authenticate his identity whereupon the account balance is provided 460 in confirmation of the "transaction" of requesting a balance confirmation. This transaction can also include obtaining 460 a record of account activity, e.g., of purchases and sales, deposits and withdrawals, fees and taxes assessed, and payments or other actions coming due in the future.

Further, in any transaction processed by process 400, 400' payment can be made in cash money in which case the transaction is designated 405, 410 as being for cash payment, and one party gives the cash payment to the other party who confirms 430 the receipt thereof as described. The other applicable steps of process 400, 400' are otherwise as described.

For transactions involving only a small amount, e.g., a transaction of less than a predetermined value that is stored in the payment card, the transaction may be carried out without a direct online connection to servers 30-50 for immediate clearing of the transaction with the financial institution. In that case, preferably the POS device 20 is required, e.g., by its internal programming, to connect to the POS server system 10 periodically for clearing of the transactions stored within the POS device 20. The system 10 and/or POS device 20 is programmed to require such connection based on a fixed interval requirement, e.g., the passage of a predetermined period of time, or on a number of transactions requirement.

The amount of the stored value that can be processed by a POS device 20 without direct clearing through system 10 is preferably preset by the user, and optionally subject to limits imposed by system 10 and/or by the merchants and/or institutions utilizing system 10. All financial transactions that are above the stored value, whether the transaction amount is limited by the system 10 and/or by a customer specified amount, are required to be performed online with real-time clearing between the financial institutions.

FIG. 5 is a schematic diagram of a plural tiered layered security level feature usable with the system 10 and method 400, 400' herein. The tier-1 lowest level of security comprises a user providing only one factor such as something including, e.g., an element the user has such as an account number or a user identifier (ID) or providing something the user knows such as a PIN. Tier-1 security may be acceptable for routine transactions of small value and/or high frequency, e.g., a daily transaction, such as buying a cup of coffee or of tea or a donut, e.g., applications wherein the amount of possible loss is minimal and doesn't warrant the effort or expense of requiring higher security.

The tier-2 level of security comprises a user providing two factors and may be acceptable for routine transactions of medium or modest value, e.g., a transaction such as buying a modest meal of a small grocery order. The two factors employed can offer a graduated level of security within the medium security tier-2, from lower medium to medium to higher medium security, and each of the three variants is illustrated with a pair of braces enclosing the elements thereof. In tier-2 the amount of potential loss, while modest, is deemed to justify some additional expense and effort to detect and thwart unauthorized transactions.

A slightly lower level of medium security may employ something the user has such as an account number or a user identifier (ID) and providing something the user knows such as a PIN. A slightly higher or medium level of medium security may employ something the user knows and something the user is, e.g., a biometric identifier, and a higher yet level of medium security may employ something the user is and something the user is, e.g., a biometric identifier.

The highest level of security is tier-3 wherein three different factors or elements are required to authenticate a user: something the user has such as an account number or a user identifier (ID), and something the user knows such as a PIN, and something the user is, e.g., a biometric identifier such as a fingerprint, a facial image, a dynamic signature, an eye or iris scan and so forth.

Tier-3 highest security is illustrated with a pair of braces enclosing the elements thereof, and is suitable for secure electronic transactions, online banking and account management, and large transactions involving large amounts, including transactions wherein the access necessary to engage in the transaction provides access to a valuable account, access to valuable and/or sensible data, an ability to affect other transactions, an ability to change account data, and any other situation deemed worthy of heightened security, irrespective of the actual amount of the present transaction. The level of security preferably relates to the level of risk that could be incurred were a malefactor to gain access to the transaction system.

For POS devices 20 intended for use with a mobile application, e.g., a smart phone configured by a downloaded software app, for conducting transactions with the use of POS system 10, a GPS locating device (or another suitable locating arrangement, all referred to as GPS) may be, and preferably is required to be, included therein. For each transaction event, the GPS data and time, e.g., the GPS time, will be geo-tagged with the transaction data as part of the audit trail. The geo-tagged data is also hashed and encrypted with the rest of the transaction data record before their being transmitted, e.g., for authentication of the transaction.

Examples of biometric identifier registration and/or verification are described in U.S. Pat. No. 9,384,518 entitled "BIOMETRIC REGISTRATION AND VERIFICATION SYSTEM AND METHOD," in U.S. Pat. No. 9,286,511 entitled "EVENT REGISTRATION AND MANAGEMENT SYSTEM AND METHOD EMPLOYING GEO-TAGGING AND BIOMETRICS," and in U.S. Pat. No. 9,830,674 entitled "BIOMETRIC REGISTRATION AND/OR VERIFICATION SYSTEM AND METHOD," each of which is hereby incorporated herein by reference in its entirety.

Examples of dynamic signature biometric identifiers and the use thereof are described in U.S. Pat. No. 6,694,045 entitled "GENERATION AND VERIFICATION OF A DIGITIZED SIGNATURE" and in U.S. Pat. No. 7,894,634 entitled "GENERATION AND AUTHENTICATION OF DIGITIZED BIO-METRIC DATA FOR CONDUCTING A TRANSACTION," both of which are hereby incorporated herein by reference in their entirety.

A method 10, 100, 200 for conducting an electronic transaction may comprise the steps of: receiving a token representative of a transaction; receiving identifying demographic data for a user; receiving identifying biometric data of a user, wherein the identifying biometric data is not stored permanently; generating a biometric template representative of the received identifying biometric data from which the received biometric data cannot be derived; destroying the received identifying biometric data, whereby the received identifying biometric data is destroyed and only the biometric template representative of the received identifying biometric data remains; attaching the biometric template to the token; communicating the token and attached biometric template for completing the transaction represented by the token; comparing the communicated token and attached biometric template with reference data representative of the transaction and with a reference biometric template representative of the identifying biometric data of the user and then: when the communicated token matches the reference data representative of the transaction and the attached biometric template matches the reference biometric template, then removing the biometric template from the token, authorizing the transaction, completing the transaction and returning the token to the user to communicate the completion of the transaction; or when the communicated token does not match the reference data representative of the transaction or when the attached biometric template does not match the reference biometric template or when both the communicated token and attached biometric template do not match, then rejecting the transaction and communicating the rejection of the transaction to the user. The method 10, 100, 200 may further comprise: encrypting or hashing or encrypting and hashing the biometric template; or encrypting or hashing or encrypting and hashing the biometric template and the token to which it is attached. The method 10, 100, 200 may further comprise: decrypting the biometric template prior to the step of comparing the communicated token and attached biometric template; or decrypting the biometric template and the token to which it is attached prior to the step of comparing the communicated token and attached biometric template. The method 10, 100, 200 may further comprise: rehashing the communicated biometric template prior to the step of comparing the communicated token and attached biometric template, and comparing the rehash of the communicated biometric template with the communicated hash of the biometric template; or rehashing the communicated biometric template and the token to which it is attached prior to the step of comparing the communicated token and attached biometric template, and comparing the rehash of the communicated biometric template and token with the communicated hash of the biometric template and token. The method 10, 100, 200 may further comprise: storing the communicated token in a transaction database; or storing the biometric template that is attached to the communicated token in a transaction database; or storing the communicated token and biometric template attached thereto in a transaction database. The method 10, 100, 200 may further comprise: receiving a software application that enables an electronic device to perform the step of receiving identifying biometric data of a user, the step of generating a biometric template representative of the received identifying biometric data, and the step of destroying the received identifying biometric data. The method 10, 100, 200 wherein: the step of receiving identifying biometric data of a user immediately precedes the step of generating a biometric template representative of the received identifying biometric data which immediately precedes the step of destroying the received identifying biometric data. The method 10, 100, 200 wherein the steps of receiving a token representative of a transaction, receiving identifying demographic data for a user, receiving biometric identifying data of a user, generating a biometric template, attaching the biometric template to the token, and communicating the token and attached biometric template are performed by a user device, the user device may comprise: a point of sale terminal, a smart phone, a tablet computer, a portable computer, a kiosk, a user terminal, or a dedicated user terminal. The method 10, 100, 200 wherein the user device includes a touch screen display, a biometric sensor, and a contact-less card reader and/or a contact card reader. The method 10, 100, 200 wherein the steps of receiving identifying demographic data for a user; receiving identifying biometric data of a user, wherein the identifying biometric data is not stored permanently; generating a biometric template representative of the received identifying biometric data from which the received biometric data cannot be derived; and destroying the received identifying biometric data, whereby the received identifying biometric data is destroyed and only the biometric template representative of the received identifying biometric data remains: are employed for registering a user; or are employed for authenticating a user; or are employed for registering a user and for authenticating the user.

A method 10, 100, 200 for conducting an electronic transaction with a user device may comprise the steps of: providing a token representative of a transaction to the user device; receiving demographic data identifying a user of the user device; enabling the user device to receive identifying biometric data for the user, wherein the identifying biometric data is not stored permanently and is not transmitted by the user device; enabling the user device to generate a biometric template representative of the received identifying biometric data, wherein the received identifying biometric data cannot be derived from the biometric template; enabling the user device to destroy the received identifying biometric data, whereby the received identifying biometric data is destroyed and only the biometric template representative of the received identifying biometric data remains; enabling the user device to attach the biometric template to the token; receiving the token and attached biometric template for completing the transaction represented by the token; comparing the communicated token and attached biometric template with reference data representative of the transaction and with a reference biometric template representative of the identifying biometric data, and then: when the communicated token matches the reference data representative of the transaction and the attached biometric template matches the reference biometric template, then removing the biometric template from the token, authorizing the transaction, completing the transaction and returning the token to the user to communicate the completion of the transaction; or when the communicated token does not match the reference data representative of the transaction or when the attached biometric template does not match the reference biometric template or when both the communicated token and attached biometric template do not match, then rejecting the transaction and communicating the rejection of the transaction to the user. The method 10, 100, 200 may further comprise: encrypting or hashing or encrypting and hashing the biometric template; or encrypting or hashing or encrypting and hashing the biometric template and the token to which it is attached. The method of claim 2 may further comprise: decrypting the biometric template prior to the step of comparing the communicated token and attached biometric template; or decrypting the biometric template and the token to which it is attached prior to the step of comparing the communicated token and attached biometric template. The method 10, 100, 200 may further comprise: rehashing the communicated biometric template prior to the step of comparing the communicated token and attached biometric template, and comparing the rehash of the communicated biometric template with the communicated hash of the biometric template; or rehashing the communicated biometric template and the token to which it is attached prior to the step of comparing the communicated token and attached biometric template, and comparing the rehash of the communicated biometric template and token with the communicated hash of the biometric template and token. The method 10, 100, 200 may further comprise: storing the communicated token in a transaction database; or storing the biometric template that is attached to the communicated token in a transaction database; or storing the communicated token and biometric template attached thereto in a transaction database. The method 10, 100, 200 may further comprise: providing a software application that enables the user device to receive identifying biometric data of a user, to generate a biometric template representative of the received identifying biometric data, and to destroy the received identifying biometric data. The method 10, 100, 200 wherein: the user device is enabled to receive identifying biometric data of a user and immediately generate the biometric template representative of the received identifying biometric data and then to immediately destroy the received identifying biometric data. The method 10, 100, 200 wherein the user device is enabled to receive a token representative of a transaction, to receive identifying demographic data for the user, to receive biometric identifying data of the user, to generate the biometric template, to attach the biometric template to the token, and to communicate the token and attached biometric template, the user device may comprise: a point of sale terminal, a smart phone, a tablet computer, a portable computer, a kiosk, a user terminal, or a dedicated user terminal. The method 10, 100, 200 wherein the user device includes a touch screen display, a biometric sensor, and a contact-less card reader and/or a contact card reader. The method of claim 1 wherein the steps of: receiving demographic data identifying a user of the user device; enabling the user device to receive identifying biometric data for the user, wherein the identifying biometric data is not stored permanently and is not transmitted by the user device; enabling the user device to generate a biometric template representative of the received identifying biometric data, wherein the received identifying biometric data cannot be derived from the biometric template; and enabling the user device to destroy the received identifying biometric data, whereby the received identifying biometric data is destroyed and only the biometric template representative of the received identifying biometric data remains: are employed for registering a user; or are employed for authenticating a user; or are employed for registering a user and for authenticating the user.

A computer-readable storage medium encoded with non-transitory computer instructions for conducting a transaction may comprise: means for causing a computer to provide a token representative of a transaction; means for causing the computer to receive identifying demographic data for a user; means for causing the computer to receive a biometric identifier for the user; means for causing the computer to generate a biometric template representative of the biometric identifier, wherein the biometric identifier cannot be derived from the biometric template and the biometric identifier is then destroyed, whereby only the biometric template representative of the received biometric identifier remains; means for causing the computer to enable the user device to attach the biometric template to the token; and means for causing the computer to receive the token and attached biometric template for completing the transaction represented by the token. The computer-readable storage medium may further comprise: means for causing the computer to encrypt or hash or encrypt and hash the biometric template; or means for causing the computer to encrypt or hash or encrypt and hash the biometric template and the token to which it is attached. The computer-readable storage medium may further comprise: means for causing the computer to decrypt the biometric template prior to causing the computer to compare the communicated token and attached biometric template; or means for causing the computer to decrypt the biometric template and the token to which it is attached prior to causing the computer to compare the communicated token and attached biometric template. The computer-readable storage medium may further comprise: means for causing the computer to rehash the communicated biometric template prior to causing the computer to compare the communicated token and attached biometric template, and causing the computer to compare the rehash of the communicated biometric template with the communicated hash of the biometric template; or means for causing the computer to rehash the communicated biometric template and the token to which it is attached prior to causing the computer to compare the communicated token and attached biometric template, and causing the computer to compare the rehash of the communicated biometric template and token with the communicated hash of the biometric template and token. The computer-readable storage medium may further comprise: means for causing the computer to store the communicated token in a transaction database; or means for causing the computer to store the biometric template that is attached to the communicated token in a transaction database; or means for causing the computer to store the communicated token and biometric template attached thereto in a transaction database. The computer-readable storage medium may further comprise: means for causing the computer to provide a software application that enables the user device to receive identifying biometric data of a user, to generate a biometric template representative of the received identifying biometric data, and to destroy the received identifying biometric data. The computer-readable storage medium wherein: the user device is enabled to receive identifying biometric data of a user and immediately generate the biometric template representative of the received identifying biometric data and then to immediately destroy the received identifying biometric data. The computer-readable storage medium wherein the user device is enabled to receive a token representative of a transaction, to receive identifying demographic data for the user, to receive biometric identifying data of the user, to generate the biometric template, to attach the biometric template to the token, and to communicate the token and attached biometric template, the user device may comprise: a point of sale terminal, a smart phone, a tablet computer, a portable computer, a kiosk, a user terminal, or a dedicated user terminal. The computer-readable storage medium wherein the user device includes a touch screen display, a biometric sensor, and a contact-less card reader and/or a contact card reader. The computer-readable storage medium may further comprise: means for causing the computer to complete the transaction represented by the token when the token matches the reference data and the biometric template matches the reference biometric template. The computer-readable storage medium of claim s1 wherein: the means for causing the computer to receive identifying demographic data for a user; the means for causing the computer to receive a biometric identifier for the user; and the means for causing the computer to generate a biometric template representative of the biometric identifier, wherein the biometric identifier cannot be derived from the biometric template and the biometric identifier is then destroyed: are employed for registering a user; or are employed for authenticating a user; or are employed for registering a user and for authenticating the user.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

The terms "biometric," "biometric identifier," "biometric image," "biometric data," and/or "biometric image data" and the like are intended to refer to a representation and/or representations, typically a digital representation and/or representations, of one or more biometric characteristics of a living being and the terms are considered to be interchangeable, unless the context clearly indicates otherwise.

Although terms such as "front," "back," "rear," "side," "end," "top," "bottom," "up," "down," "left," "right," "upward," "downward," "forward," "backward," "under" and/or "over," "vertical," "horizontal," and the like may be used herein as a convenience in describing one or more embodiments and/or uses of the present arrangement, the articles described may be positioned in any desired orientation and/or may be utilized in any desired position and/or orientation. Such terms of position and/or orientation should be understood as being for convenience only, and not as limiting of the invention as claimed.

As used herein, the term "and/or" encompasses both the conjunctive and the disjunctive cases, so that a phrase in the form "A and/or B" encompasses "A" or "B" or "A and B." In addition, the term "at least one of" one or more elements is intended to include one of any one of the elements, more than one of any of the elements, and two or more of the elements up to and including all of the elements, and so, e.g., the phrase in the form "at least one of A, B and C" includes "A," "B," "C," "A and B," "A and C," "B and C," and "A and B and C."

As used herein, image and/or information are used interchangeably with respect to what is captured by an imaging device and/or is displayed on a display device, and are intended to encompass any and all of the wide variety of devices that a user may desire, including, but not limited to, visual images and pictures, whether still or moving, whether captured and/or generated by a camera, computer or any other source, whether true, representative or abstract or arbitrary, whether or not including symbols or characters such as alphanumeric characters or mathematical notations, whether captured and/or displayed in black and white, monochrome, polychrome or full color.

It is noted that while biometric data, biometric templates, transaction data, various identifiers, encrypted data, hashed data and the like are referred to as "numbers," each may include numerical, alphabetic, alpha-numeric and other characters and symbols, conventional or arbitrary, as may be desired. Information is typically represented and/or stored in a memory in accordance with a predetermined formula or algorithm or other scheme, either on a character by character basis or on the basis of one or more combinations of the characters or values, for example, binary, binary coded decimal, hexadecimal, or any other digital coding representation thereof. A parity or check number or code, if any, may likewise be representative of the information represented or stored in the memory in accordance with a predetermined formula or algorithm or other scheme, either on a character by character basis or on the basis of one or more combinations of the characters or values stored in the memory. Suitable formula and algorithms therefor may include, for example, binary, binary coded decimal, other digital coding representations thereof, parity checks or other parity representations, sum checks, field relationship checks or any other predetermined relationship between the stored data or information and the parity or check number or code.

The present arrangement can be and preferably is at least in part embodied as a computer implemented process or processes and/or apparatus for performing such computer-implemented process or processes, and can also be embodied in the form of a tangible medium containing a non-transitory computer program or other machine-readable instructions (herein "computer program"), wherein when the computer program is loaded into a computer or other processor (herein "computer") and/or is executed by the computer, the computer becomes an apparatus for practicing the process or processes. Storage media for containing such computer program include, for example, floppy disks and diskettes, compact disk (CD)-ROMs (whether or not writeable), DVD digital disks, RAM and ROM memories, computer hard drives and back-up drives, external hard drives, "thumb" drives, and any other non-transitory storage medium readable by a computer. The process or processes can also be embodied in the form of a computer program, for example, whether stored in a storage medium or transmitted over a transmission medium such as electrical conductors, fiber optics or other light conductors, or by electromagnetic radiation, wherein when the computer program is loaded into a computer and/or is executed by the computer, the computer becomes a non-transitory apparatus for practicing the process or processes. The process or processes may be implemented on a general purpose microprocessor or on a digital processor specifically configured to practice the process or processes. When a general-purpose microprocessor is employed, the computer program code configures the circuitry of the microprocessor to create specific logic circuit arrangements. Storage medium readable by a computer includes medium being readable by a computer per se or by another machine that reads the computer instructions for providing those instructions to a computer for controlling its operation. Such machines may include, for example, a punched card reader, a magnetic tape reader, a magnetic card reader, a memory card reader, an optical scanner, as well as machines for reading the storage media mentioned above.

While various operations, steps and/or elements of a process or method or operation may be described in an order or sequence, the operations, steps and/or elements do not need to be performed in that order or sequence, or in any particular order or sequence, unless expressly stated to require a particular order or sequence.

As used herein, the terms "connected" and "coupled" as well as variations thereof may or may not be intended to be exact synonyms, but may also encompass some similar things and some different things. The term "connected" as indicated by its context may be used generally to refer to elements that have a direct electrical and/or physical contact to each other, whereas the term "coupled" as indicated by its context may be used generally to refer to elements that have an indirect electrical and/or physical contact with each other, e.g., via one or more intermediate elements, so as to cooperate and/or interact with each other, and may include elements in direct contact as well.

While the present invention has been described in terms of the foregoing example embodiments, variations within the scope and spirit of the present invention as defined by the claims following will be apparent to those skilled in the art. For example, retaining the biometric identifier sample only temporarily while a biometric template representative thereof is generated could be accomplished by storing the sample in a specially designated DRAM that ceases to be refreshed once the template is generated or by designating a specific cell by its address in RAM to receive the sample and then overwriting that cell, e.g., with pseudo-random characters or with all 1s followed by all 0s, or by otherwise resetting that cell. In addition, the specific cell in RAM that is designated and then overwritten can be changed each time a biometric identifier sample is being taken.

In each of the processes (methods) described, the steps thereof may be performed in the order given and in another order or orders unless specifically stated to be required to be performed in a given order. For example, while the sampling of a biometric identifier must precede the generating of a biometric template from the biometric sample and the generating of the biometric template must precede the destroying of the biometric sample, other steps may be interposed between those steps and additionally those steps may be performed earlier or later in the performance of the overall method or process than as described.

Each of the U.S. Provisional Applications, U.S. Patent Applications, and/or U.S. Patents, identified herein is hereby incorporated herein by reference in its entirety, for any purpose and for all purposes irrespective of how it may be referred to or described herein.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A method for conducting an electronic transaction comprising the steps of:
    receiving a token representative of a transaction;
    receiving identifying demographic data for a user;
    receiving identifying biometric data of a user, wherein the identifying biometric data is not stored permanently;
    generating a biometric template representative of the received identifying biometric data from which the received biometric data cannot be derived;
    destroying the received identifying biometric data, whereby the received identifying biometric data is destroyed and only the biometric template representative of the received identifying biometric data remains;
    attaching the biometric template to the token;
    communicating the token and attached biometric template for completing the transaction represented by the token;
    comparing the communicated token and attached biometric template with reference data representative of the transaction and with a reference biometric template representative of the identifying biometric data of the user and then:
        when the communicated token matches the reference data representative of the transaction and the attached biometric template matches the reference biometric template, then removing the biometric template from the token, authorizing the transaction, completing the transaction and returning the token to the user to communicate the completion of the transaction; or
        when the communicated token does not match the reference data representative of the transaction or when the attached biometric template does not match the reference biometric template or when both the communicated token and attached biometric template do not match, then rejecting the transaction and communicating the rejection of the transaction to the user.

2. The method of claim 1 further comprising:
    encrypting or hashing or encrypting and hashing the biometric template; or
    encrypting or hashing or encrypting and hashing the biometric template and the token to which it is attached.

3. The method of claim 2 further comprising:
    decrypting the biometric template prior to the step of comparing the communicated token and attached biometric template; or
    decrypting the biometric template and the token to which it is attached prior to the step of comparing the communicated token and attached biometric template.

4. The method of claim 2 further comprising:
    rehashing the communicated biometric template prior to the step of comparing the communicated token and attached biometric template, and comparing the rehash of the communicated biometric template with the communicated hash of the biometric template; or
    rehashing the communicated biometric template and the token to which it is attached prior to the step of comparing the communicated token and attached biometric template, and comparing the rehash of the communicated biometric template and token with the communicated hash of the biometric template and token.

5. The method of claim 1 further comprising:
    storing the communicated token in a transaction database; or
    storing the biometric template that is attached to the communicated token in a transaction database; or
    storing the communicated token and biometric template attached thereto in a transaction database.

6. The method of claim 1 further comprising:
    receiving a software application that enables an electronic device to perform the step of receiving identifying biometric data of a user, the step of generating a biometric template representative of the received identifying biometric data, and the step of destroying the received identifying biometric data.

7. The method of claim 1 wherein: the step of receiving identifying biometric data of a user immediately precedes the step of generating a biometric template representative of the received identifying biometric data which immediately precedes the step of destroying the received identifying biometric data.

8. The method of claim 1 wherein the steps of receiving a token representative of a transaction, receiving identifying demographic data for a user, receiving biometric identifying data of a user, generating a biometric template, attaching the biometric template to the token, and communicating the token and attached biometric template are performed by a user device, the user device comprising: a point of sale terminal, a smart phone, a tablet computer, a portable computer, a kiosk, a user terminal, or a dedicated user terminal.

9. The method of claim 1 wherein the user device includes a touch screen display, a biometric sensor, and a contact-less card reader and/or a contact card reader.

10. The method of claim 1 wherein the steps of receiving identifying demographic data for a user; receiving identifying biometric data of a user, wherein the identifying biometric data is not stored permanently; generating a biometric template representative of the received identifying biometric data from which the received biometric data cannot be derived; and destroying the received identifying biometric data, whereby the received identifying biometric data is destroyed and only the biometric template representative of the received identifying biometric data remains:
    are employed for registering a user; or
    are employed for authenticating a user; or
    are employed for registering a user and for authenticating the user.

11. A method for conducting an electronic transaction with a user device comprising the steps of:
    providing a token representative of a transaction to the user device;
    receiving demographic data identifying a user of the user device;
    enabling the user device to receive identifying biometric data for the user, wherein the identifying biometric data is not stored permanently and is not transmitted by the user device;
    enabling the user device to generate a biometric template representative of the received identifying biometric data, wherein the received identifying biometric data cannot be derived from the biometric template;

enabling the user device to destroy the received identifying biometric data, whereby the received identifying biometric data is destroyed and only the biometric template representative of the received identifying biometric data remains;

enabling the user device to attach the biometric template to the token;

receiving the token and attached biometric template for completing the transaction represented by the token;

comparing the communicated token and attached biometric template with reference data representative of the transaction and with a reference biometric template representative of the identifying biometric data, and then:

when the communicated token matches the reference data representative of the transaction and the attached biometric template matches the reference biometric template, then removing the biometric template from the token, authorizing the transaction, completing the transaction and returning the token to the user to communicate the completion of the transaction; or when the communicated token does not match the reference data representative of the transaction or when the attached biometric template does not match the reference biometric template or when both the communicated token and attached biometric template do not match, then rejecting the transaction and communicating the rejection of the transaction to the user.

12. The method of claim 11 further comprising:
encrypting or hashing or encrypting and hashing the biometric template; or
encrypting or hashing or encrypting and hashing the biometric template and the token to which it is attached.

13. The method of claim 12 further comprising:
decrypting the biometric template prior to the step of comparing the communicated token and attached biometric template; or
decrypting the biometric template and the token to which it is attached prior to the step of comparing the communicated token and attached biometric template.

14. The method of claim 12 further comprising:
rehashing the communicated biometric template prior to the step of comparing the communicated token and attached biometric template, and comparing the rehash of the communicated biometric template with the communicated hash of the biometric template; or
rehashing the communicated biometric template and the token to which it is attached prior to the step of comparing the communicated token and attached biometric template, and comparing the rehash of the communicated biometric template and token with the communicated hash of the biometric template and token.

15. The method of claim 11 further comprising:
storing the communicated token in a transaction database; or
storing the biometric template that is attached to the communicated token in a transaction database; or
storing the communicated token and biometric template attached thereto in a transaction database.

16. The method of claim 11 further comprising:
providing a software application that enables the user device to receive identifying biometric data of a user, to generate a biometric template representative of the received identifying biometric data, and to destroy the received identifying biometric data.

17. The method of claim 11 wherein: the user device is enabled to receive identifying biometric data of a user and immediately generate the biometric template representative of the received identifying biometric data and then to immediately destroy the received identifying biometric data.

18. The method of claim 11 wherein the user device is enabled to receive a token representative of a transaction, to receive identifying demographic data for the user, to receive biometric identifying data of the user, to generate the biometric template, to attach the biometric template to the token, and to communicate the token and attached biometric template, the user device comprising: a point of sale terminal, a smart phone, a tablet computer, a portable computer, a kiosk, a user terminal, or a dedicated user terminal.

19. The method of claim 11 wherein the user device includes a touch screen display, a biometric sensor, and a contact-less card reader and/or a contact card reader.

20. The method of claim 11 wherein the steps of: receiving demographic data identifying a user of the user device; enabling the user device to receive identifying biometric data for the user, wherein the identifying biometric data is not stored permanently and is not transmitted by the user device; enabling the user device to generate a biometric template representative of the received identifying biometric data, wherein the received identifying biometric data cannot be derived from the biometric template; and enabling the user device to destroy the received identifying biometric data, whereby the received identifying biometric data is destroyed and only the biometric template representative of the received identifying biometric data remains:
are employed for registering a user; or
are employed for authenticating a user; or
are employed for registering a user and for authenticating the user.

21. A computer-readable storage medium encoded with non-transitory computer instructions for conducting a transaction comprising:
means for causing a computer to provide a token representative of a transaction;
means for causing the computer to receive identifying demographic data for a user;
means for causing the computer to receive a biometric identifier for the user;
means for causing the computer to generate a biometric template representative of the biometric identifier, wherein the biometric identifier cannot be derived from the biometric template and the biometric identifier is then destroyed, whereby only the biometric template representative of the received biometric identifier remains;
means for causing the computer to enable the user device to attach the biometric template to the token;
means for causing the computer to receive the token and attached biometric template for completing the transaction represented by the token;
means for causing the computer to remove the biometric template from the token; and
means for causing the computer to return the token for completing the transaction represented by the token.

22. The computer-readable storage medium of claim 21 further comprising:
means for causing the computer to encrypt or hash or encrypt and hash the biometric template; or means for causing the computer to encrypt or hash or encrypt and hash the biometric template and the token to which it is attached.

23. The computer-readable storage medium of claim 22 further comprising:
means for causing the computer to decrypt the biometric template prior to causing the computer to compare the communicated token and attached biometric template; or
means for causing the computer to decrypt the biometric template and the token to which it is attached prior to causing the computer to compare the communicated token and attached biometric template.

24. The computer-readable storage medium of claim 22 further comprising:
means for causing the computer to rehash the communicated biometric template prior to causing the computer to compare the communicated token and attached biometric template, and causing the computer to compare the rehash of the communicated biometric template with the communicated hash of the biometric template; or
means for causing the computer to rehash the communicated biometric template and the token to which it is attached prior to causing the computer to compare the communicated token and attached biometric template, and causing the computer to compare the rehash of the communicated biometric template and token with the communicated hash of the biometric template and token.

25. The computer-readable storage medium of claim 21 further comprising:
means for causing the computer to store the communicated token in a transaction database; or
means for causing the computer to store the biometric template that is attached to the communicated token in a transaction database; or
means for causing the computer to store the communicated token and biometric template attached thereto in a transaction database.

26. The computer-readable storage medium of claim 21 further comprising:
means for causing the computer to provide a software application that enables the user device to receive identifying biometric data of a user, to generate a biometric template representative of the received identifying biometric data, and to destroy the received identifying biometric data.

27. The computer-readable storage medium of claim 21 wherein: the user device is enabled to receive identifying biometric data of a user and immediately generate the biometric template representative of the received identifying biometric data and then to immediately destroy the received identifying biometric data.

28. The computer-readable storage medium of claim 21 wherein the user device is enabled to receive a token representative of a transaction, to receive identifying demographic data for the user, to receive biometric identifying data of the user, to generate the biometric template, to attach the biometric template to the token, and to communicate the token and attached biometric template, the user device comprising: a point of sale terminal, a smart phone, a tablet computer, a portable computer, a kiosk, a user terminal, or a dedicated user terminal.

29. The computer-readable storage medium of claim 21 wherein the user device includes a touch screen display, a biometric sensor, and a contact-less card reader and/or a contact card reader.

30. The computer-readable storage medium of claim 21 further comprising: means for causing the computer to complete the transaction represented by the token when the token matches the reference data and the biometric template matches the reference biometric template.

31. The computer-readable storage medium of claim 21 wherein: the means for causing the computer to receive identifying demographic data for a user; the means for causing the computer to receive a biometric identifier for the user; and the means for causing the computer to generate a biometric template representative of the biometric identifier, wherein the biometric identifier cannot be derived from the biometric template and the biometric identifier is then destroyed:
are employed for registering a user; or
are employed for authenticating a user; or
are employed for registering a user and for authenticating the user.

* * * * *